United States Patent
Petersen et al.

(10) Patent No.: US 11,849,509 B2
(45) Date of Patent: Dec. 19, 2023

(54) APPARATUS, METHOD, AND COMPUTER PROGRAM

(71) Applicant: NOKIA TECHNOLOGIES OY, Espoo (FI)

(72) Inventors: Karsten Aarrebo Petersen, Aalborg (DK); Bent Henneberg Rysgaard, Aalborg (DK); István Zsolt Kovács, Aalbaorg (DK); Troels Emil Kolding, Klarup (DK); Roberto Maldonado, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 17/301,293

(22) Filed: Mar. 30, 2021

(65) Prior Publication Data

US 2021/0307112 A1    Sep. 30, 2021

(30) Foreign Application Priority Data

Mar. 30, 2020    (FI) ..................................... 20205314

(51) Int. Cl.
   *H04W 88/12*    (2009.01)
   *H04W 24/08*    (2009.01)
   *H04W 88/18*    (2009.01)

(52) U.S. Cl.
   CPC ........... *H04W 88/12* (2013.01); *H04W 24/08* (2013.01); *H04W 88/18* (2013.01)

(58) Field of Classification Search
   CPC ...... H04W 88/12; H04W 88/18; H04W 24/08
   USPC ....................................................... 370/328
   See application file for complete search history.

(56) References Cited

U.S. PATENT DOCUMENTS

| | | | | |
|---|---|---|---|---|
| 8,660,480 | B2 * | 2/2014 | Jacobs | H04W 76/50 455/418 |
| 9,042,823 | B2 * | 5/2015 | Palin | H04W 8/005 455/410 |
| 9,628,485 | B2 * | 4/2017 | Chakraborty | H04W 4/21 |
| 2011/0223931 | A1 * | 9/2011 | Buer | G01S 11/08 455/456.1 |

(Continued)

FOREIGN PATENT DOCUMENTS

| | | | |
|---|---|---|---|
| EP | 3151619 A1 | 4/2017 | |
| EP | 2586267 B1 * | 8/2019 | ........... H04L 5/0091 |

OTHER PUBLICATIONS

Search Report for European Application No. 21164774.8, dated Aug. 5, 2021, 10 pages.

(Continued)

*Primary Examiner* — Mong-Thuy T Tran
(74) *Attorney, Agent, or Firm* — Brake Hughes Bellermann LLP

(57) ABSTRACT

An apparatus, provided in use in a first device comprises at least one processor and at least one memory including a computer program code, the at least one memory and computer program code configured to, with the at least one processor, cause the apparatus at least to: receive first information about a context provided by a controller, said first information being received from a base station; and cause the first device to transmit one or more ping messages to one or more second devices, said one or more ping messages comprising information about said context which causes one or more second devices to reply to the controller.

20 Claims, 17 Drawing Sheets

(56) References Cited

U.S. PATENT DOCUMENTS

| | | | |
|---|---|---|---|
| 2012/0252398 A1* | 10/2012 | Jacobs | H04B 7/15507 455/404.1 |
| 2014/0022986 A1* | 1/2014 | Wu | H04W 68/02 370/328 |
| 2015/0019717 A1 | 1/2015 | Li et al. | |
| 2017/0013497 A1* | 1/2017 | Lee | H04W 28/0268 |
| 2018/0027401 A1 | 1/2018 | Niu et al. | |
| 2018/0176293 A1* | 6/2018 | Ding | H04W 8/005 |
| 2018/0367590 A1* | 12/2018 | Baldwin | H04W 12/08 |
| 2019/0020993 A1* | 1/2019 | Nguyen | H04L 51/046 |
| 2019/0327599 A1* | 10/2019 | Neybert | G06Q 50/265 |
| 2019/0387401 A1* | 12/2019 | Liao | H04W 8/08 |
| 2020/0059976 A1* | 2/2020 | Bhatia | H04W 8/005 |
| 2020/0092685 A1* | 3/2020 | Fehrenbach | H04W 72/23 |
| 2021/0182111 A1* | 6/2021 | Jakobsson | G06F 9/5055 |
| 2021/0228893 A1* | 7/2021 | Akram | A61N 1/3904 |

OTHER PUBLICATIONS

Office Action for European Application No. 21164774.8, dated Jun. 30, 2022, 6 pages.
Office Action and Search Report for Finnish Patent Application No. 20205314, dated Jul. 16, 2020 (9 pages).

\* cited by examiner

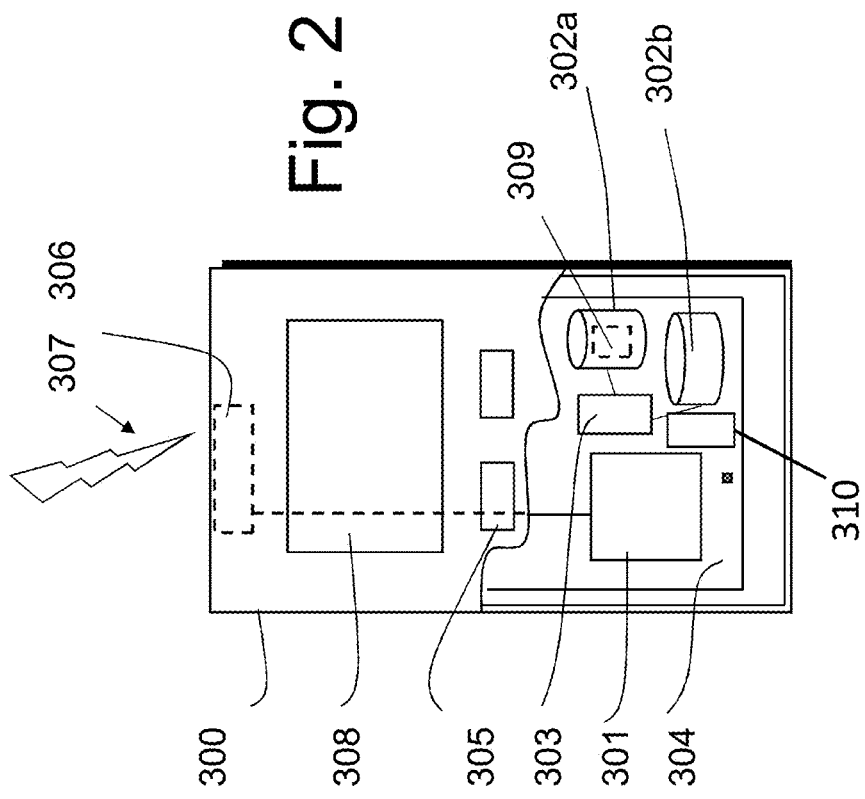
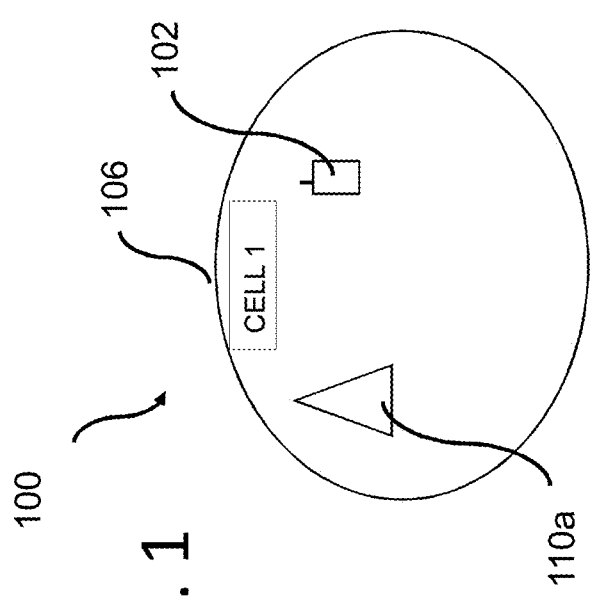

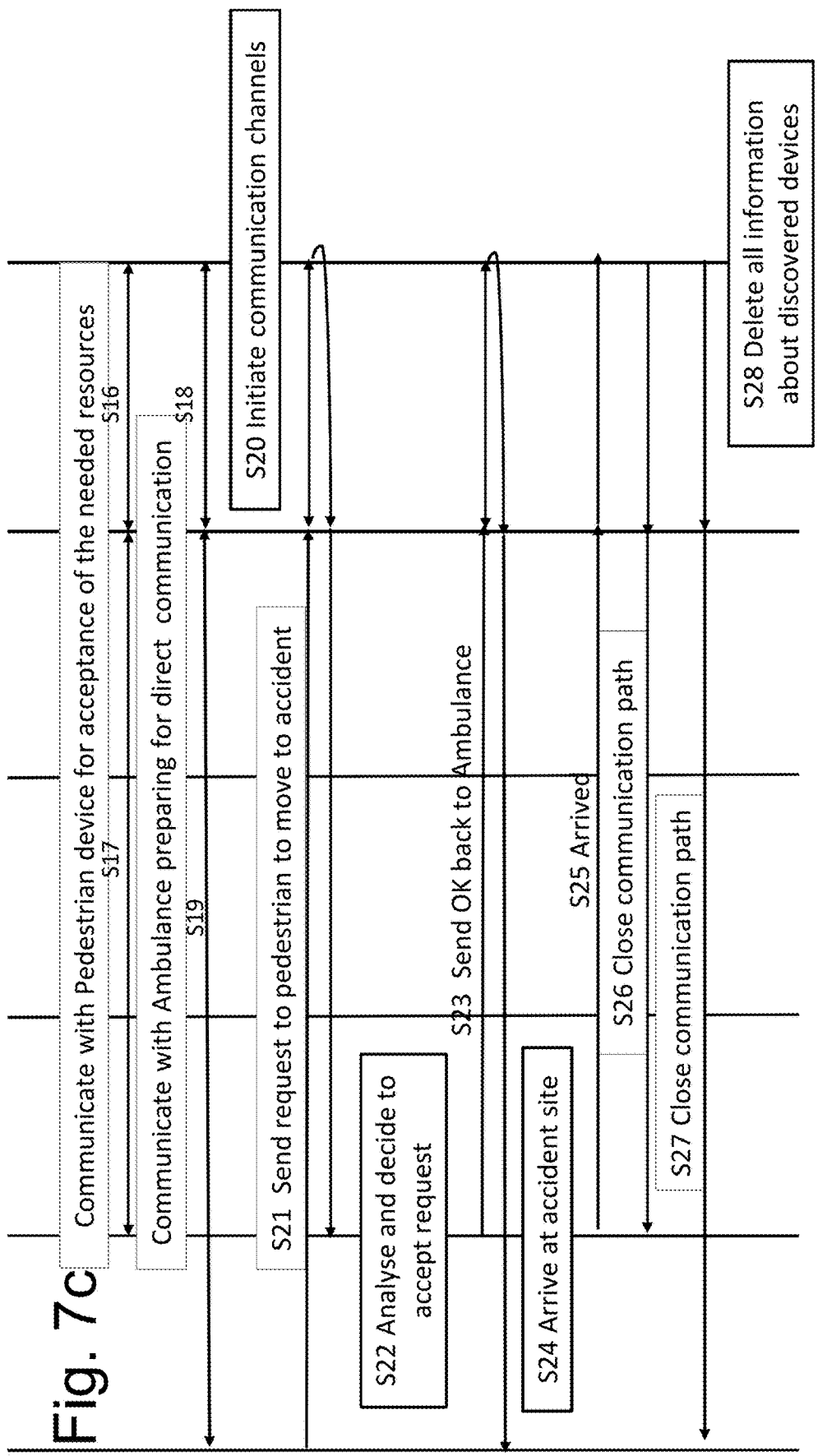

APPARATUS, METHOD, AND COMPUTER PROGRAM

CROSS-REFERENCE TO RELATED APPLICATIONS

This application claims priority under 35 U.S.C. § 119 (a)-(d) and 37 C.F.R. § 1.55 to Finnish Patent Application No. 20205314, filed Mar. 30, 2020, the disclosure of which is hereby incorporated by reference herein in its entirety.

FIELD OF THE DISCLOSURE

The present disclosure relates to an apparatus, a method, and a computer program and in particular but not exclusively for apparatus, methods and computer programs for use in assistance scenarios.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus, provided in use in a first device, said apparatus comprising: at least one processor and at least one memory including a computer program code, the at least one memory and computer program code configured to, with the at least one processor, cause the apparatus at least to: receive first information about a context provided by a controller, said first information being received from a base station; and cause the first device to transmit one or more ping messages to one or more second devices, said one or more ping messages comprising information about said context which causes one or more second devices to reply to the controller.

The one or more second devices may reply to the controller via the first device.

The one or more second devices may reply to the controller via a base station. The base station may be the same or different to the base station providing the first information.

The at least one memory and computer program code may be configured to, with the at least one processor, cause the apparatus to cause a request to be transmitted to the controller via the base station for the context, the first information about the context being received in response to the request.

The at least one memory may be configured to store second information about radio resources, the apparatus may cause the radio resources to be used to transmit the one or more ping messages.

The at least one memory and computer program code may be configured to, with the at least one processor, cause the apparatus to receive second information about radio resources from the base station and cause the first device to use the radio resources to transmit the one or more ping messages.

The at least one memory and computer program code may be configured to, with the at least one processor, cause the apparatus to cause a request to be transmitted to the controller via the base station for the radio resources, the second information about the radio resources being received in response to the request.

The information about the radio resources may be provided by the first information.

The request for radio resources may be the request the context.

The at least one memory and computer program code may be configured to, with the at least one processor, cause the apparatus to cause communication between the first device and one or more of the second devices via the controller after the ping message has been received by the respective second device.

The at least one memory and computer program code may be configured to, with the at least one processor, cause the apparatus to cause the first device to temporarily act as an access node.

The ping message may comprise one or more of: session identity information; and information about support required from the second device and/or an associated user.

The information about support may comprise a group identifier and optionally one or more subgroup identifiers.

The ping message may comprise location information associated with the first device.

According to another aspect, there is provided an apparatus, provided in use in a second device, said apparatus comprising: at least one processor and at least one memory including a computer program code, the at least one memory and computer program code configured to, with the at least one processor, cause the apparatus at least to: receive a ping message which is transmitted by a first device, said message comprising information about a context associated with a controller; and cause a message to be transmitted to the controller using the context associated with the controller.

The at least one memory and computer program code may be configured to, with the at least one processor, cause the apparatus to receive information from a base station indicating that a first device is to be temporarily included in neighbor node presence monitoring performed by the second device.

The at least one memory and computer program code may be configured to, with the at least one processor, cause the apparatus to cause the message to be transmitted to the controller via the first device.

The at least one memory and computer program code may be configured to, with the at least one processor, cause the apparatus to cause the message to be transmitted to the controller via a base station.

The at least one memory and computer program code may be configured to, with the at least one processor, cause the apparatus to receive information from a network indicating that a first device should be temporarily included in neighbor node presence monitoring.

The at least one memory and computer program code may be configured to, with the at least one processor, cause the apparatus to determine that support which is requested in said at least one ping message can be provided, and provide in the message to be transmitted to said controller information indicating that the support which is requested can be provided.

The at least one memory and computer program code may be configured to, with the at least one processor, cause the apparatus to request input from an associated human user to indicate that the requested support can be provided.

The at least one memory and computer program code may be configured to, with the at least one processor, cause the apparatus to determine that support which is requested in said at least one ping message can be provided in response to input requested from an associated user of the device.

The at least one memory and computer program code may be configured to, with the at least one processor, cause the apparatus to cause communication between the second device and a device via the controller after the message has been transmitted to the controller.

The device which communicates with the second device via the controller may be the first device or an emergency services provider.

The ping message may comprise one or more of: session identity information; and information about support required from the second device and/or an associated user.

The information about support may comprise a group identifier and optionally one or more subgroup identifiers.

The ping message may comprise location information associated with the first device.

According to another aspect, there is provided an apparatus, provided in use in a controller, said apparatus comprising: at least one processor and at least one memory including a computer program code, the at least one memory and computer program code configured to, with the at least one processor, cause the apparatus at least to: receive a request for a context from a first device; cause a message to be transmitted from the controller to the first device via a base station, said message comprising first information about the context; and receive one or more responses from one or more second devices using the context, the one or more responses being to one or more ping messages transmitted by the first device.

The at least one memory and computer program code may be configured to, with the at least one processor, cause the apparatus to determine based on the one or more responses which one or more second devices the controller is to communicate with.

The at least one memory and computer program code may be configured to, with the at least one processor, cause the apparatus to control handling of available radio resources by the first device.

According to another aspect, there is provided an apparatus, provided in use in a first device, said apparatus comprising means for: receiving first information about a context provided by a controller, said first information being received from a base station; and causing the first device to transmit one or more ping messages to one or more second devices, said one or more ping messages comprising information about said context which causes one or more second devices to reply to the controller.

The one or more second devices may reply to the controller via the first device.

The one or more second devices may reply to the controller via a base station. The base station may be the same or different to the base station providing the first information.

The means may be for causing a request to be transmitted to the controller via the base station for the context, the first information about the context being received in response to the request.

The means may be for storing second information about radio resources and causing the radio resources to be used to transmit the one or more ping messages.

The means may be for receiving second information about radio resources from the base station and causing the first device to use the radio resources to transmit the one or more ping messages.

The means may be for causing a request to be transmitted to the controller via the base station for the radio resources, the second information about the radio resources being received in response to the request.

The information about the radio resources may be provided by the first information.

The request for radio resources may be the request the context.

The means may be for causing communication between the first device and one or more of the second devices via the controller after the ping message has been received by the respective second device.

The means may be for causing the first device to temporarily act as an access node.

The ping message may comprise one or more of: session identity information; and information about support required from the second device and/or an associated user.

The information about support may comprise a group identifier and optionally one or more subgroup identifiers.

The ping message may comprise location information associated with the first device.

According to another aspect, there is provided an apparatus, provided in use in a second device, said apparatus comprising means for: receiving a ping message which is transmitted by a first device, said message comprising information about a context associated with a controller; and causing a message to be transmitted to the controller using the context associated with the controller.

The means may be for receiving information from a base station indicating that a first device is to be temporarily included in neighbor node presence monitoring performed by the second device.

The means may be for causing transmitting of the message to the controller via the first device.

The means may be for causing transmitting of the message to the controller via a base station.

The means may be for receiving information from a network indicating that a first device should be temporarily included in neighbor node presence monitoring.

The means may be for determining that support which is requested in said at least one ping message can be provided, and providing in the message to be transmitted to said controller information indicating that the support which is requested can be provided.

The means may be for requesting input from an associated human user to indicate that the requested support can be provided.

The means may be for determining that support which is requested in said at least one ping message can be provided in response to input requested from an associated user of the device.

The means may be for causing communication between the second device and a device via the controller after the message has been transmitted to the controller.

The device which communicates with the second device via the controller may be the first device or an emergency services provider.

The ping message may comprise one or more of: session identity information; and information about support required from the second device and/or an associated user.

The information about support may comprise a group identifier and optionally one or more subgroup identifiers.

The ping message may comprise location information associated with the first device.

According to another aspect, there is provided an apparatus, provided in use in a controller, said apparatus comprising means for: receiving a request for a context from a first device; causing a message to be transmitted from the controller to the first device via a base station, said message comprising first information about the context; and receiving one or more responses from one or more second devices using the context, the one or more responses being to one or more ping messages transmitted by the first device.

The means may be for determining based on the one or more responses which one or more second devices the controller is to communicate with.

The means may be for controlling handling of available radio resources by the first device.

According to another aspect, there is provided a method comprising: receiving first information about a context provided by a controller, said first information being received from a base station; and causing a first device to transmit one or more ping messages to one or more second devices, said one or more ping messages comprising information about said context which causes one or more second devices to reply to the controller.

The one or more second devices may reply to the controller via the first device.

The one or more second devices may reply to the controller via a base station. The base station may be the same or different to the base station providing the first information.

The method may comprise causing a request to be transmitted to the controller via the base station for the context, the first information about the context being received in response to the request.

The method may comprise storing second information about radio resources and causing the radio resources to be used to transmit the one or more ping messages.

The method may comprise receiving second information about radio resources from the base station and causing the first device to use the radio resources to transmit the one or more ping messages.

The method may comprise causing a request to be transmitted to the controller via the base station for the radio resources, the second information about the radio resources being received in response to the request.

The information about the radio resources may be provided by the first information.

The request for radio resources may be the request the context.

The method may comprise causing communication between the first device and one or more of the second devices via the controller after the ping message has been received by the respective second device.

The method may comprise causing the first device to temporarily act as an access node.

The ping message may comprise one or more of: session identity information; and information about support required from the second device and/or an associated user.

The information about support may comprise a group identifier and optionally one or more subgroup identifiers.

The ping message may comprise location information associated with the first device.

The method may be performed by an apparatus. The apparatus may be the first device or provided in the first device.

According to another aspect, there is provided a method comprising: receiving a ping message which is transmitted by a first device, said message comprising information about a context associated with a controller; and causing a message to be transmitted to the controller using the context associated with the controller.

The method may comprise receiving information from a base station indicating that a first device is to be temporarily included in neighbor node presence monitoring performed by a second device.

The method may comprise causing transmitting of the message to the controller via the first device.

The method may comprise causing transmitting of the message to the controller via a base station.

The method may comprise receiving information from a network indicating that a first device should be temporarily included in neighbor node presence monitoring.

The method may comprise determining that support which is requested in said at least one ping message can be provided, and providing in the message to be transmitted to said controller information indicating that the support which is requested can be provided.

The method may comprise requesting input from an associated human user to indicate that the requested support can be provided.

The method may comprise determining that support which is requested in said at least one ping message can be provided in response to input requested from an associated user of the device.

The method may comprise causing communication between a second device and a device via the controller after the message has been transmitted to the controller.

The device which communicates with the second device via the controller may be the first device or an emergency services provider.

The ping message may comprise one or more of: session identity information; and information about support required from the second device and/or an associated user.

The information about support may comprise a group identifier and optionally one or more subgroup identifiers.

The ping message may comprise location information associated with the first device.

The method may be performed by an apparatus. The apparatus may be the second device or in the second device.

According to another aspect, there is provided a method comprising: receiving a request for a context from a first device; causing a message to be transmitted from a controller to the first device via a base station, said message comprising first information about the context; and receiving one or more responses from one or more second devices using the context, the one or more responses being to one or more ping messages transmitted by the first device.

The method may comprise determining based on the one or more responses which one or more second devices the controller is to communicate with.

The method may comprise controlling handling of available radio resources by the first device.

The method may be performed by an apparatus. The apparatus may be the controller or an apparatus in the controller.

According to another aspect, there is provided a system comprising: a controller, a first device and one or more second device, the controller, the first device and one or more second devices being configured such that: the first device is configured to transmit a request for a context to the controller via a base station and receive first information about the requested context from the controller via the base station; the first device is configured to transmit one or more ping messages to the one or more second devices, said one or more ping messages comprising information about the requested context; one or more second devices are configured to reply to the controller using the requested context.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 1 shows a schematic diagram of an example communication system comprising a base station and a communication device;

FIG. 2 shows a schematic diagram of an example mobile communication device;

FIGS. 7a, 7b and 7c show a first signal flow of some embodiments;

DETAILED DESCRIPTION OF THE FIGURES

Figure 3:
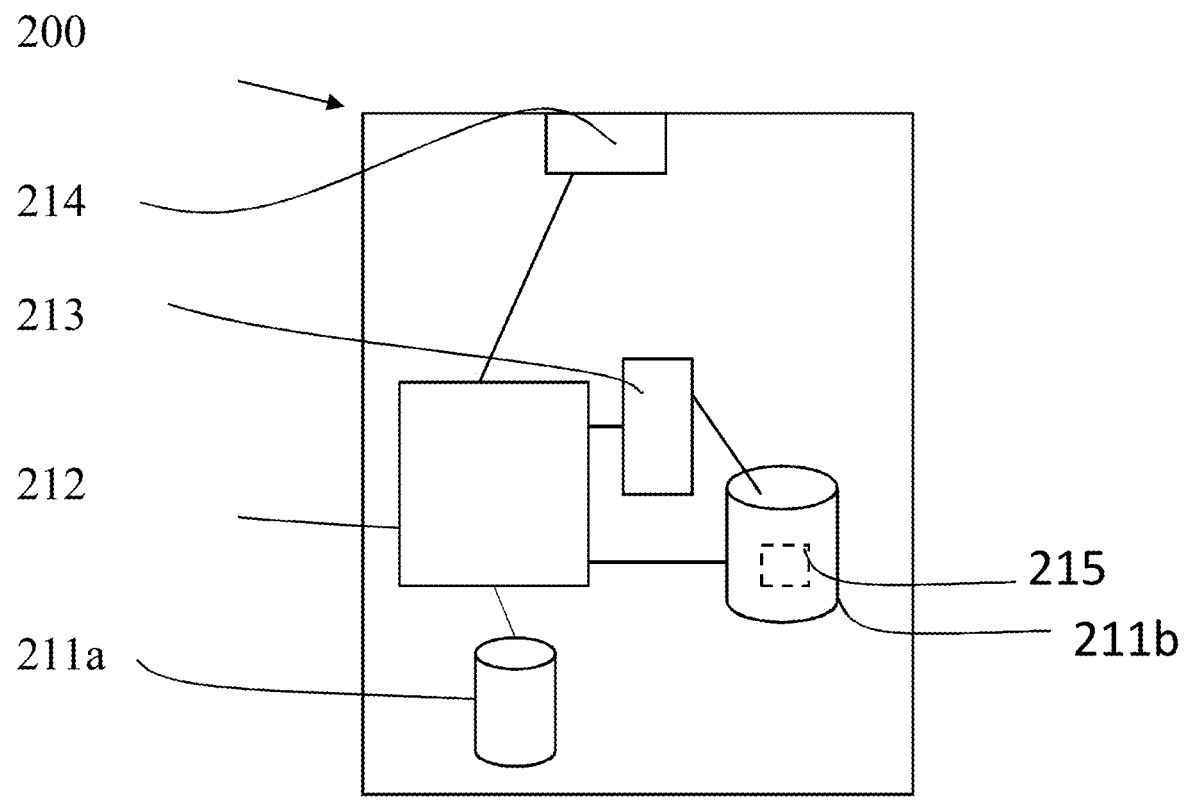
FIG. 3 shows a schematic diagram of an example apparatus provided in a network entity.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As is known, wireless systems can be divided into cells, and are therefore often referred to as cellular systems. Typically, an access point such as a base station provides at least one cell. The cellular system can support communications between user equipment (UE).

In the following, different exemplifying embodiments will be described using, as an example of an access architecture to which the embodiments may be applied, a 5G radio access architecture. However, embodiments are not limited to such an architecture. Some examples of other options for suitable systems are the universal mobile telecommunications system (UMTS) radio access network (UTRAN or E-UTRAN), long term evolution (LTE), LTE-A (LTE advanced) wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS) or any combination thereof.

FIG. 1 which shows a cell of a wireless communication system 100. The cell is part of a public land mobile network PLMN. A PLMN is typically made up of a number of cells. As can be seen a communications device 102 is served by cell 1 106 which is provided by a first base station 110a which may be a gNB (a 5G base station).

The communication devices may be any suitable communications device. The communications devices have a wireless connection to a base station or other access point.

FIG. 2 illustrates an example of a communications device 300, such as the wireless communications device 102 shown on FIG. 1. The wireless communications device 300 may be provided by any device capable of sending and receiving radio signals. Non-limiting examples comprise a mobile station (MS) or user equipment (UE) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like. The communications device may be provided as part of another device.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the communications device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 309 to implement one or more of the following aspects. The software code 309 may be stored in the at least one memory, for example in the at least one ROM 302a.

A geo-position sensor 310 may optionally be provided for determining the geo-location of the communications device. This may use a satellite positioning technology and/or any other suitable technology. In some embodiments, the sensor may alternatively or at least partially provided by the at least one processor. Alternatively or additionally, the sensor may be provided by suitable hardware or circuitry.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display 308, a speaker and a microphone may be provided depending on the type of the device.

An example apparatus is shown in FIG. 3. FIG. 3 shows an example of an apparatus 200 for a radio access network entity such as a gNB or access node or for a server. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
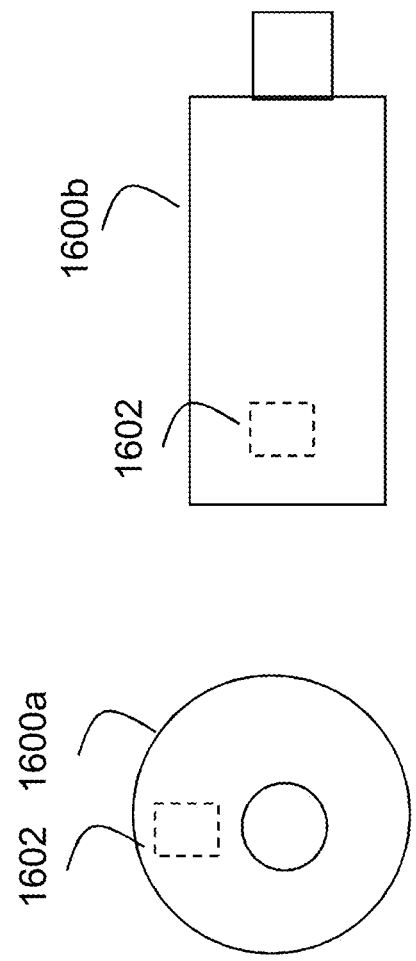
FIG. 4 shows a schematic representation of a non-volatile memory medium storing instructions which when executed by a processor allow a processor to perform one or more of the procedures of the method of some embodiments.

FIG. 4 shows a schematic representation of non-volatile memory media 1600a (e.g., computer disc (CD) or digital versatile disc (DVD)) and 1600b (e.g., universal serial bus (USB) memory stick) storing instructions and/or parameters 1602 which when executed by a processor allow the processor to perform any of the methods of any of the embodiments or a part of any of the methods of any of the embodiments.

Figure 5:
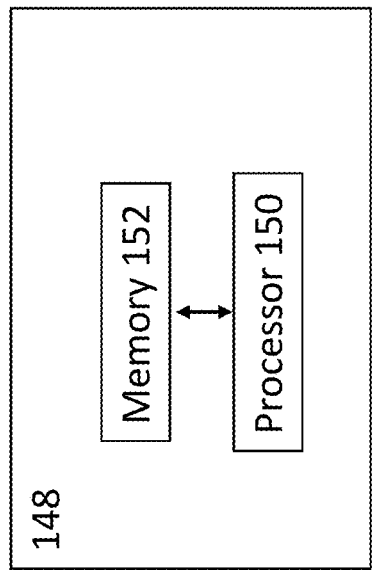
FIG. 5 shows an example apparatus which may be provided in a device or server or access point.

FIG. 5 shows an apparatus 148. The apparatus 148 may be provided in a device and/or a server and/or an access node and/or in a communications device. The apparatus may comprise at least processor 150 and at least one memory 152 including computer code for one or more programs. This apparatus may be configured to cause some embodiments to be performed.

In some situations, it may be desirable to be able to know which resources are available in the near vicinity of a location. This may be useful in emergency or similar situations. These resources may be of assistance in providing support, for example in emergency situations.

It may be helpful if for example paramedic personnel may be informed about what kind of people/equipment/medicine are in the vicinity of an accident site. This may be handled by standard handheld devices supporting a low power mode with wakeup capabilities and/or some people may have IoT (Internet of things) like devices implanted in their body. These devices may be heart monitors, glucose monitors, etc. These sorts of device may only be active from a network connectivity perspective between longer inactive periods to save power. It may therefore be desirable to determine if there is a doctor in the near vicinity who could help and/or determine if someone might have insulin available and/or to provide information about a patient such as if that patient has any known illness. This may be provided by one or more devices which are implanted in the individual or carried by an individual.

In some situations, one or more devices linked to a relevant resource may be a low power device such as an IoT device. Such devices may run on battery power. These devices may not be attached to a network, for example to minimize power consumption. While it is may be desired to remotely trigger such devices to communicate with external systems in an emergency, this is problematic where the devices are not always attached to the network or only online from time to time.

Figure 6:
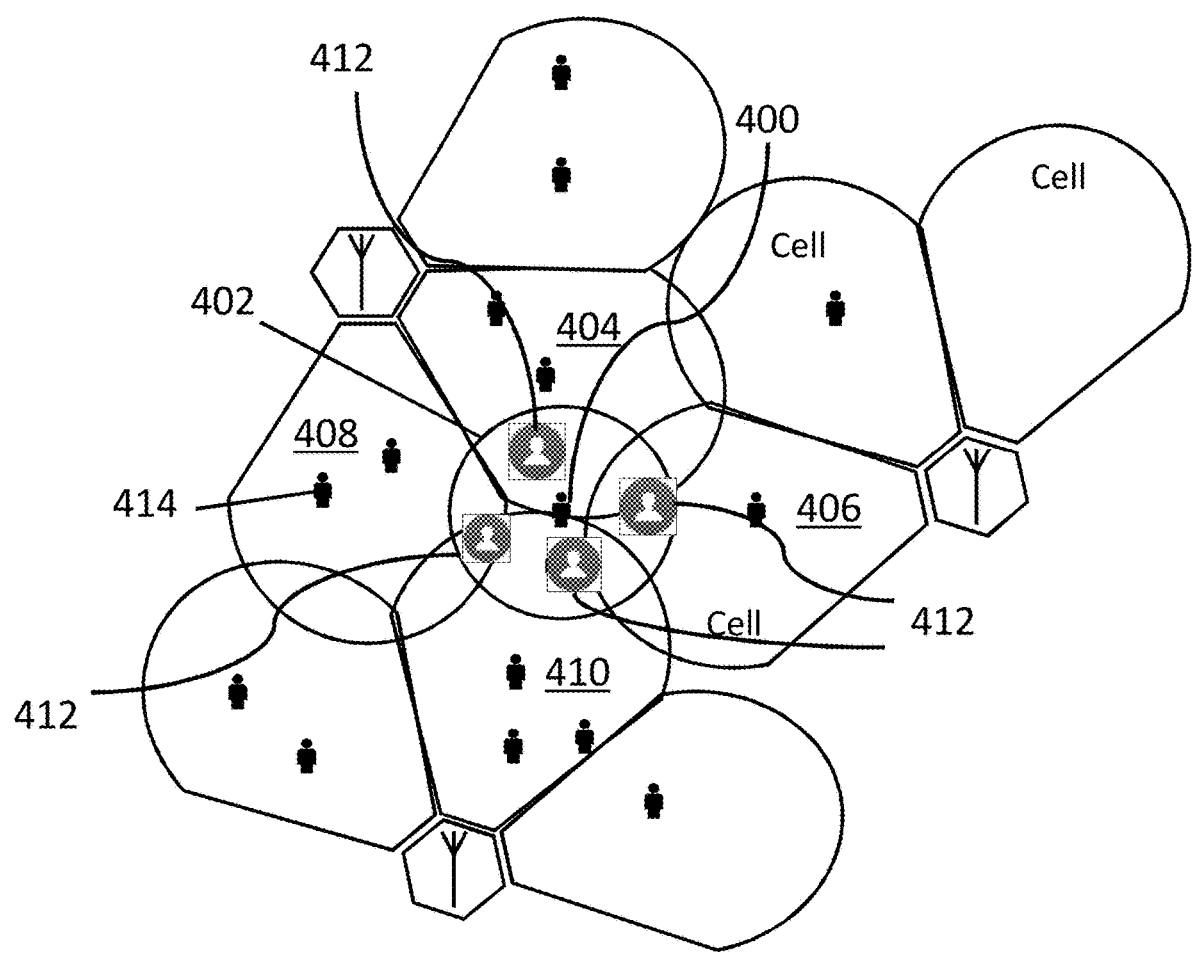
FIG. 6 shows an area of interested which is served by different cells of a cellular network.

Reference is made to FIG. 6 which shows an example of a network. In such a network, the network generally has knowledge about the devices which are attached to individual cell. However, the network may not have knowledge of the types of device and/or the owner.

The network may not know the exact position of the devices unless the user has specifically approved this due to privacy constraints.

In FIG. 6, a requester device (and/or the individual associated with that device) referenced 400 has an interest in knowing which devices (and/or the individual associated with the respective device) are inside the area shown as a circle 402 around the requester device 400. Alternatively, another device or component may have an interest in knowing what other devices are in the vicinity of requester device 400. The requester device 400 is shown as being in a border region of four cells 404, 406, 408 and 410. The circle 402 covers a part, but not all, of each of these four cells 404, 406, 408 and 410. In some situations, one or more of the cells may belong to different operators or networks.

An aim is to be able to "ping" the devices 412 which are situated within the circle 402. Previous proposals have suggested that all the devices which are with the four cells should be pinged, that is the devices 412 within the circle 402 and the devices 414 outside the circle 402. The ping process may comprise transmitting any suitable message via a suitable communication channel. By way of example only, a ping process may comprise the sending of a relatively short message or a very low payload message sent via usual radio access signalling channels such as 3GPP radio access signalling channels.

In one approach, the network may collect information about which devices are in the near vicinity of requester device 400. In this situation, the network has to contact all devices across the four cells to cover the area 402. As can be seen, use of this approach might trigger a relatively large number of devices which might load the network. There might possibly be privacy issues.

In some embodiments, the requester device 400 has the capability to "ping" near devices from its current position so that the coverage of the "ping" message may be limited to a much lower number of devices.

If there are several radio access networks (RAN) in the area, the system may have to support pinging of devices across the different RANs.

In the case a device is out of range of the provider RAN, emergency roaming may be allowed to secure a communication channel.

Some embodiments may not require GPS or other geolocation updates of relevant devices all the time. In some embodiments, a relevant device may indicate that it is in a required vicinity. That device may provide a GPS (global positioning system) position fix or other location information. The location may be estimated from GNSS (global navigation satellite system) and/or any other type of indoor or outdoor localization technique (such BT (Bluetooth), Lidar, image, video, etc.). Alternatively or additionally the network may be allowed to obtain position information of the device, from e.g., network triangulation or otherwise determine the location of that device.

In some embodiments, a requester device 400 is configured to send one or more "ping" messages.

Some embodiments may allow access to device capabilities in the vicinity of a particular requester device by directly pinging those devices directly from the requester device without the need to use the existing RAN infrastructures.

In some embodiments, the ping signal may be sent from the requester device via one or more access nodes of a RAN.

The ping method may be any suitable ping messaging method.

In some embodiments, the ping message may comprise information related to an event. The event may be used by at least one receiving device to determine if and/or how that receiving device wants to respond.

In some embodiments, one or more events may be specified so that behaviors can be associated with them. For example, when a nearby device receives a ping message with a particular event, the device will determine if given that event, it is helpful for that device to respond. For example, an event may be categorized as a particular type of medical emergency. If the device or the associated user is able to provide assistance for that particular type of medical emergency, the device will respond.

In some embodiments, one or more events identities or IDs are available. A ping message may comprise one or more IDs.

In some embodiments a requester-device may have the capability to either request or be pre-allocated radio resources (for example time slot and frequency) from a RAN for broadcasting a "ping" message which is detectable by and used to "wakeup" selected or all nearby devices. For example this may be in the form of a side-link communication. This may have a specific wake-up signature allowing for low power modes.

The requester device may request radio resources from the cloud server. The cloud server may request or allocate itself the radio resources which the requester device is to use. The requester device is not a base station. However, in some embodiments, the requester device may temporarily act as a base station to send out the ping message. The allocation of the resources to the requester device may be on the basis that the requester device is acting as a network node and not simply as a UE or the like. The requester device may be allocated resources which would otherwise be allocated to a base station.

In other embodiments, the requester device may be allocated radio resources without requiring input from the cloud server.

A nearby device is a device with detects the "ping" from the requester device. A discovered device is a nearby device is one which has initiated a connection with a server such a cloud based server or any other server.

Devices which are able to respond to a ping message may have an application installed on the device. The application may provide a mechanism by which a user is able to control a respond option. For example, the application may be an OTT (over the top) application or any other suitable application. The application may control the radio interface. The user of the device may use the application to control if or how the device responds. For example, the application may control the radio interface to respond to a ping message if event X is indicated in the message or not to respond to events Y, Z or in general and or the like. The application may be used to configure when the user of a device is "on duty" and hence that the device will respond to the ping message if appropriate and when the user of the device is "off duty" and hence that the device will not respond to the ping message or only to one or more particular events. In some embodiments, the application may be configured to respond automatically to a ping message, without user intervention. In other embodiments or situations, the application may be configured to respond to a ping message only if this is confirmed by user input.

A user associated with a device may be able to provide information such as user capabilities (for example doctor, nurse, etc.) and/or user inventory (for example medicine, etc.) and/or any other suitable information. The user may be able to provide the information via the installed application or in any other suitable manner. Alternatively or additionally, the device may be able to provide at least some information automatically without any user level interaction with an application. This information may be provided to the server.

Alternatively or additionally this may be controlled via a SIM module. For example, there may be a subscription option. For example as a doctor, the user of the device may get a monetary reward for potentially making services available to the public.

In some embodiments, the user is able to control when and/or how the device replies. This may be used to protect the privacy of the user of the device.

Figure 7A:
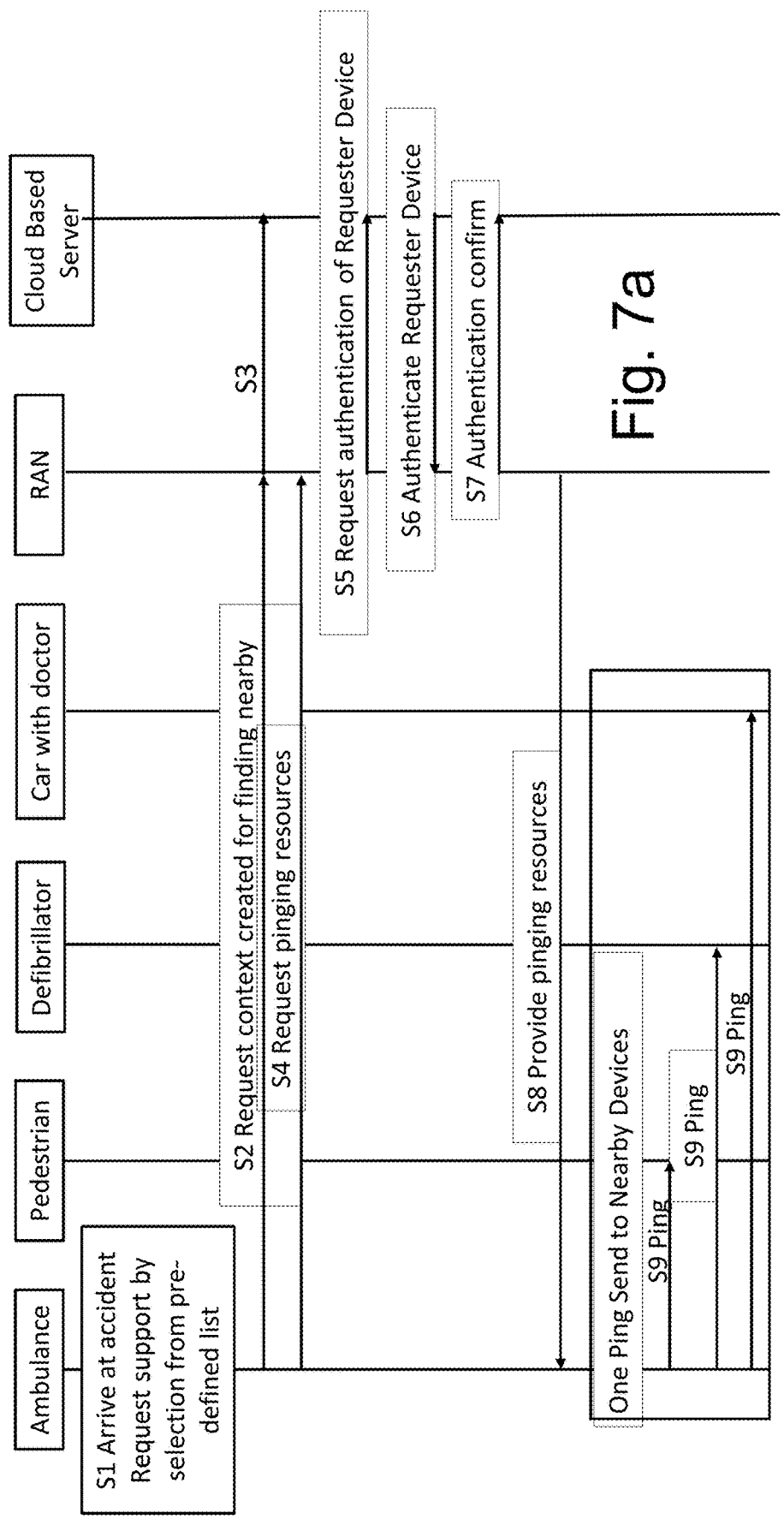
Figure 7B:
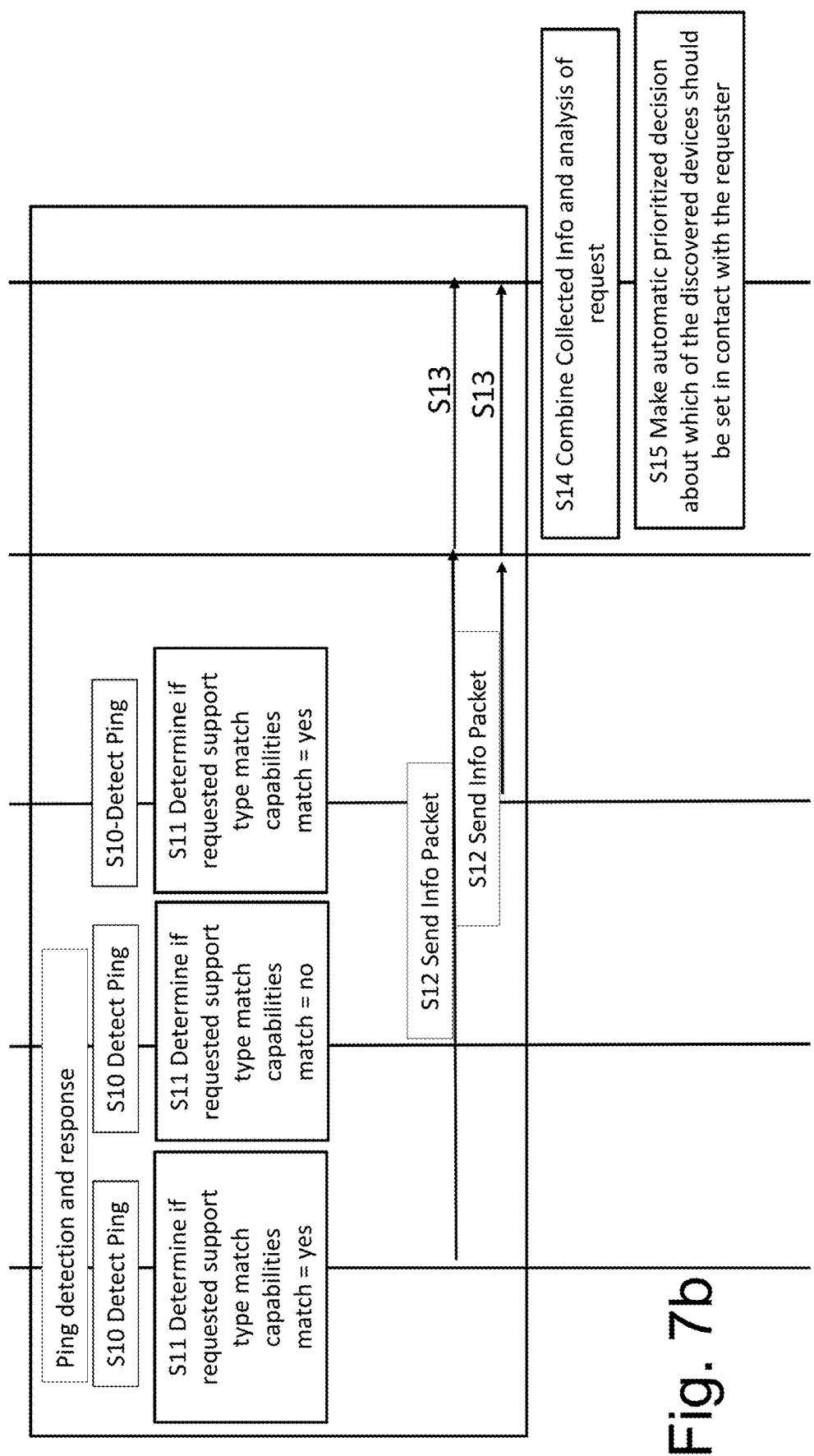

In one embodiments, a device may wish to send a ping to nearby devices so those nearby devices can indicate that they are available if needed. Reference is made to FIGS. 7a to 7c which shows a signal flow of some embodiments. The device may be an ambulance or a fixed "ping" unit acting as a requester-device. Where there are one or more fixed "ping" units, these may be provided in various locations, such as in a city. These "ping" units may be (relay/IAB (integrated access backhaul)) devices and may for example be used when an accident is called in to early identify if there are close support available and send the information to the caller. These units could for example be mounted on traffic lights or other similar infrastructure.

Reference is first made to FIG. 7a. In step S1, an ambulance has arrived at an accident location. An apparatus of a device of the ambulance is configured to receive an input request for support. This device will be referred to as the requester device in the following. The input request may be received via a user interface of the device. The user interface may receive user input selecting a support request.

In some embodiments, there may a selection for support from a pre-defined list of options.

In step S2, the apparatus of the requester device may be configured to request a context be created for finding nearby resources. The apparatus of the requester device may be configured to cause a message comprising the created context for finding nearby resources to be transmitted to a radio access network. The message may be received by, for example, an access node such as a base station.

In step S3, an apparatus of the access node may be configured to forward the context request to a cloud based server or other server. The server is configured to create the context. Information about the created context will be sent back to the requester device, via the radio access node.

In step S4, the apparatus of the requester device may be configured to cause the requester device to transmit a request to the access node for pinging resources.

It should be appreciated that in some embodiments, the messages of step S2 and S4 may be combined.

In step S5, the apparatus of the access node may be configured to cause a request to be transmitted to the cloud based server for the authentication of the requester device.

In step S6, an apparatus of the cloud server device is configured to authenticate the requester device and cause an authenticate message to be transmitted to the access node.

In step S7, the apparatus of the access node is configured to cause the access node to transmit a confirmation of authentication to the cloud based server. This authentication may be omitted in some embodiments or provided in any other suitable way.

In step S8, the apparatus of the access node is configured to cause the access node to transmit a message to the requester device. This message may comprise resources to be used for one or more ping messages.

The apparatus of the requester device is configured in step S9 to cause a ping message to be transmitted. The ping message may include information about the context provided by the cloud server. As schematically shown in FIG. 7a, the ping message is received by a number of different devices. One or more of the respective devices is woken up from a low power state to check if there is a ping message. The first device is associated with a pedestrian, a second device is associated with a defibrillator and the third device is associated with a car used by a doctor. In step S9, each of these three devices will detect the ping. It should be appreciated that the number of devices which are shown as receiving the ping may be more or less than the three shown in this example. Each of device may have an application such as described previously installed.

Reference is now made to FIG. 7b. In step S10, each of the respective devices detect the ping.

In step S11, a determination is made by a respective apparatus of the respective device as to whether a requested support type matches the capabilities associated with the device. In the case of the device associated with the pedestrian and the device associated with the car, the apparatus of the respective device is configured to make a determination that there is a match. In the case of the apparatus of the device associated with the defibrillator, the determination is that there is no match to the requested capabilities.

In S12, for those devices where a match is determined, the respective apparatus of that device is configured to cause a message to be transmitted to the access node. This message may comprise an information packet providing information about one or more of the device, the user, the location of the device and contact information. The information about the device may comprise capabilities of the device. The message will be sent with the context provided in the ping message so that the reply will be directed to the cloud server.

In step S13, the apparatus of the access node is configured to cause to the received information to be transmitted to the cloud-based server.

In step S14, the cloud based server or the apparatus of the cloud based server analyses the data. For example, the collected information may be combined and the request may be analysed.

In step S15, the cloud based server or the apparatus of the cloud based server makes a prioritized decision about which one or more of the discovered devices should be put into contact with the requester. In this example, the pedestrian is determined to be best suited. Steps S14 and S15 may be combined in some embodiments. The server may verify based on for example the capabilities of the device and/or other information if the device fulfils the requirements indicated in the ping message.

Steps S1 to S15 may be regarded as a data collection context.

Reference is now made to FIG. 7c. Steps S16 and S17 represent the communication between the cloud based server and the device associated with the pedestrian for acceptance of the required resources. Step S16 represents the communication between the cloud based servers and the access node and step S17 represents the communication between the access node and the device associated with the pedestrian.

Steps S18 and S19 represent the communication between the cloud based server and the device associated with the ambulance for preparing of direct communication between the device associated with the ambulance and the device associated with the pedestrian. Step S18 represents the communication between the cloud based server and the access node and step S19 represents the communication between the access node and the device associated with the ambulance.

In step S20, the cloud based server is configured to initiate the communication channels.

In step S21, the device associated with the ambulance is configured to send a request to the device associated with the pedestrian, requesting that the pedestrian move to the location of the accident. The request is sent from the device associated with the ambulance to the access node, from the access node to the cloud based server, from the cloud based server to the access node and from the access node to the device associated with the pedestrian. The message may indicate the location of the accident.

In step S22, the apparatus of the device or the user of the device, analyses the request and in this example determines that the request will be accepted. The pedestrian will move to the site of the accident.

In step S23, a message is sent from the device of the pedestrian to the device of the ambulance. This message is sent from the device associated with the pedestrian to the access node, from the access node to the cloud based server, from the cloud based server to the access node and from the access node to the device associated with the ambulance. The message confirms that the pedestrian has agreed to move to the site of the accident.

In step S24, the device associated with the pedestrian arrives at the accident site.

In step S25, a message confirming that the device associated with the pedestrian has arrived at the accident site. This message is sent to the cloud base server via the access node.

In step S26, a message is sent from the cloud based server via the access node to the device associated with the pedestrian closing the communication path.

In step S27, a message is sent from the cloud based server via the access node to the device associated with the ambulance closing the communication path.

Steps S26 and S27 can take place in any order or at the same time.

In step S28, the cloud server deletes all information about the discovered devices. This may be optional in some embodiments.

The steps of FIG. 7c may be regarded as the direct communications context.

While the communication path is open, other communications between the device of the ambulance and the device of the pedestrian may take place.

It should be appreciated that logical layer of the communications between the devices is securely handled by the controller. This means that data, such as contact data or the like, about one device does not need to be provided to the other device in order to provide a communication between the devices.

Figure 8A:
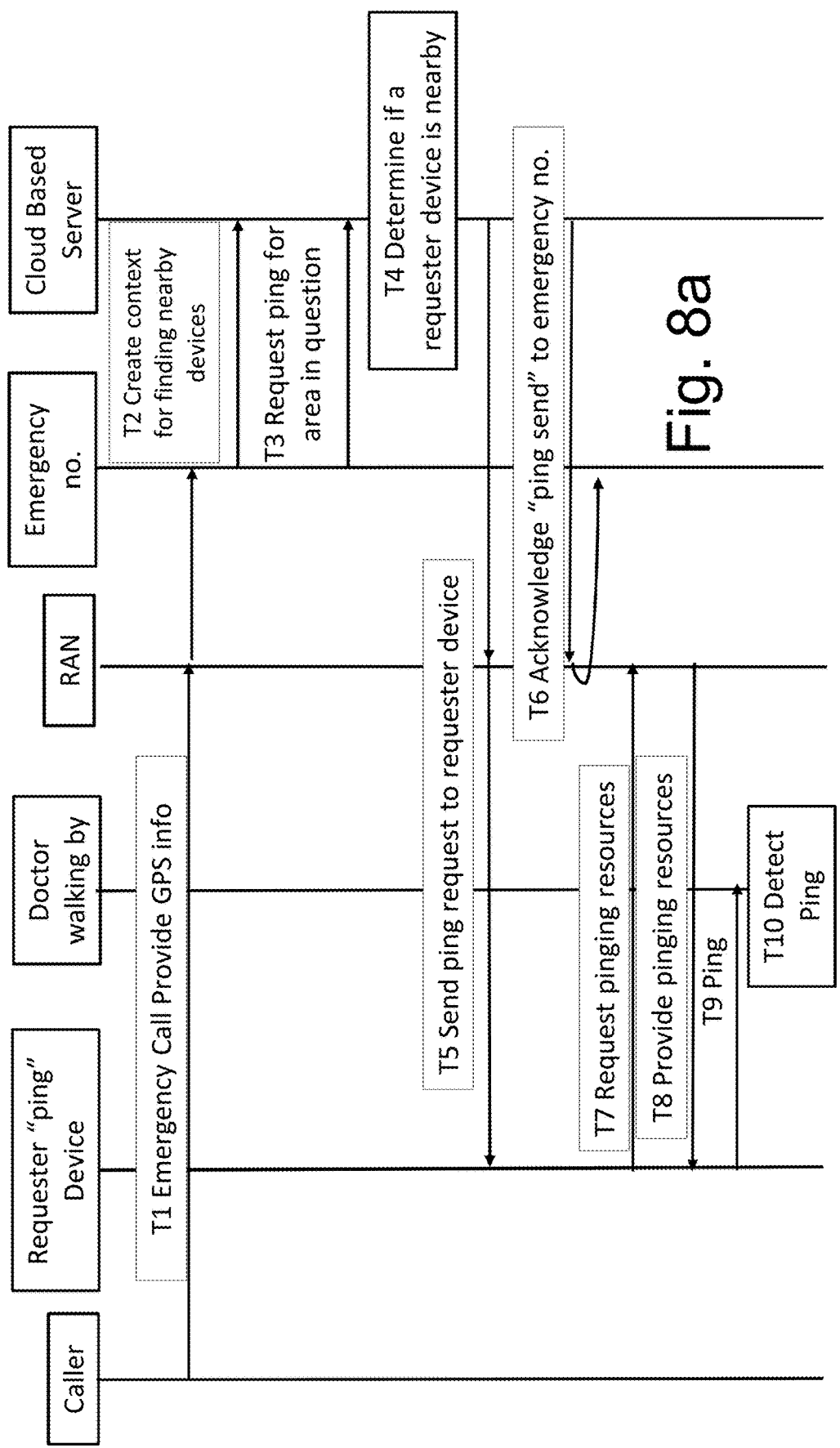
FIGS. 8a and 8b show a second signal flow of some embodiments.
Figure 8B:
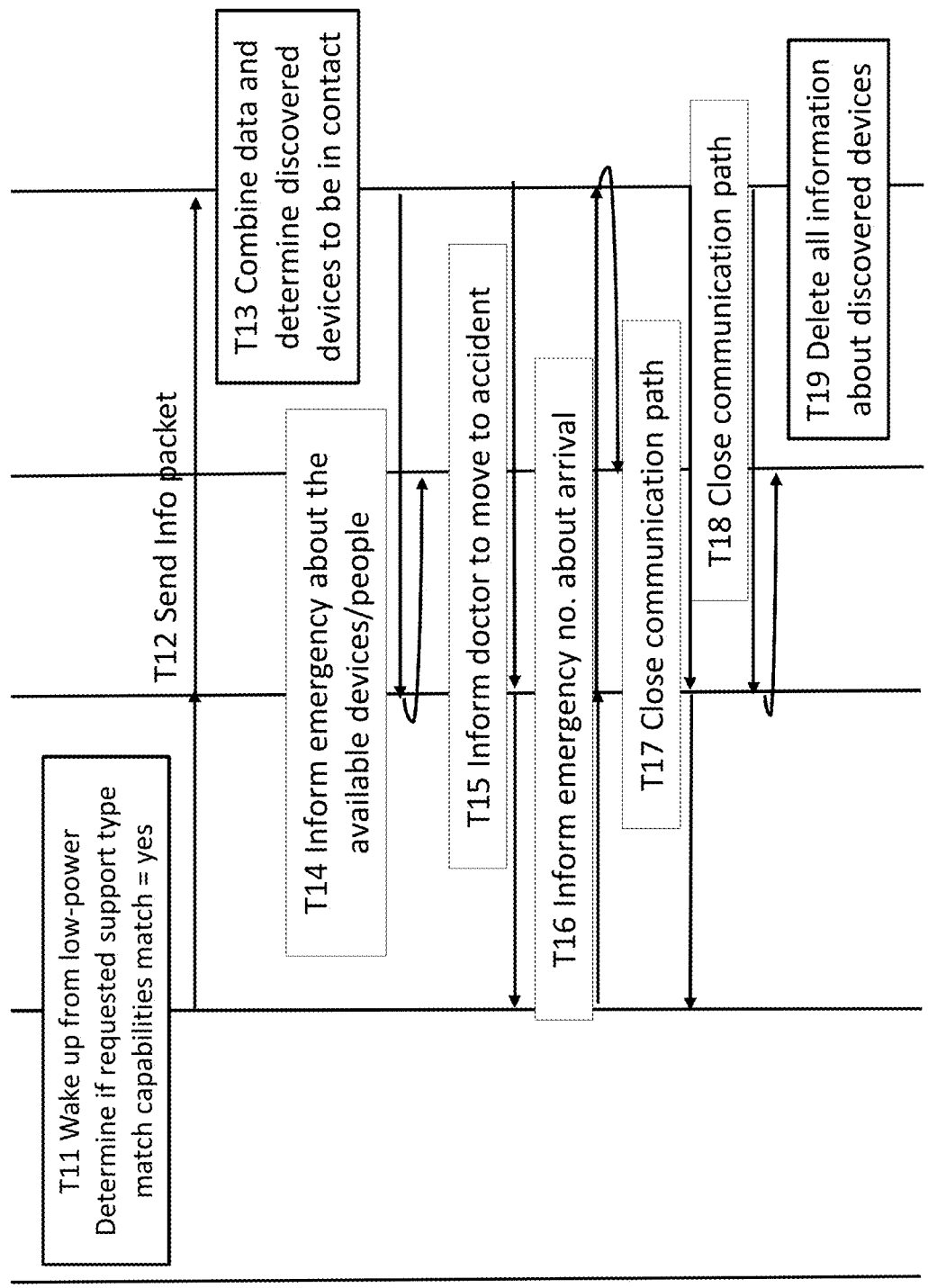

Reference is made to FIGS. 8a and 8b which show an example signal flow in a scenario where a victim is in an accident and a witness to the accident may make an emergency call or the victim themselves may make the call.

This is represented in FIG. 8a by step T1 where a call (and/or a message is sent) is made to an emergency service provider. The call is made using a mobile device and may comprise location information such discussed previously. In other embodiments, the location of the calling device may be determined using any suitable technique such as discussed previously. This may not require location information to be provided by the calling device. The call is routed by the radio access network to the emergency service provider. An apparatus of the mobile device may be configured to cause the call to be made and/or the message to be sent.

In step T2, an apparatus of the emergency service provider is configured to cause a message to be sent to the cloud based server to create a context for finding nearby devices.

In step T3, the apparatus of the emergency service provider is configured to cause a request for ping resources for the area in question. This may be based on the location of the calling device provided in step T1 or otherwise determined. In some embodiments, steps T2 and T3 may be combined.

In step T4, the cloud-based server or an apparatus of the cloud based server device is configured to determine a nearby requester device. The cloud based server may take into account the local topology. For example, if the location is at an intersection of two streets, this may be used to determine one or more requester devices.

In step T5, the cloud-based server is or an apparatus of the cloud based server device configured to send a ping request to the determined or requester device requesting that the requester device send one or more ping messages via the RAN.

In step T6, the cloud based server is configured to send a message to the emergency service provider to indicate that the ping request has been sent. This may be an acknowledgement of the sending of the ping request. The message may be sent via the radio access network to the emergency service provider. In other embodiments, there may be a direct communication path for communication between the cloud based server and the emergency service provider.

In step T7, an apparatus of the requester device is configured cause a request for ping resources to be transmitted to the radio access network. This is the resources which the requester device can use to transmit a ping message.

In step T8, an apparatus of the radio access network is configured to provide the requested resources and to cause information about the provided resources to be provided to the requester device. It should be appreciated that in some embodiments, the requester device may not need to be authenticated as it is known both to the radio access network and the server.

In step T9, an apparatus of the requester device is configured to cause a ping to be transmitted.

In step T10 the ping is detected by a device associated with a passing doctor. It should be appreciated that the ping may be detected by more than one device in some embodiments.

Reference is now made to the part of the signal flow which is shown in FIG. 8b. In step T11, the device associated with the doctor is woken up from a low power mode. It is determined by an apparatus of the requester device if the requested support type matches the capabilities of the device and/or the doctor. In this scenario it is considered that there is a match. This may involve input into the device by the user of the device, that is the doctor.

In step T12, an apparatus of the device associated with the doctor is configured to cause an information packet to be sent to the cloud-based server via the radio access network. This packet may comprise information about one or more of availability, information about the doctor, how to contact the device, location of the device and any other suitable information.

In step T13, the cloud based server is configured to combine the collected information (where there is a reply from more than one device replying to the ping) and analyse the request. A prioritized decision may be made by the cloud based server about which of the discovered devices should be put in contact with the emergency service provider. The cloud based server, in this embodiment, determines that the device associated with the doctor is best suited. It should be appreciated that in this example, a ping request is only received by one device. However, in other embodiments, it may be received by more than one device.

In step T14, a message is sent from the cloud based server to the emergency service provider. This message may be sent via the radio access network. The message may be to advise the emergency services provider about the available device and/or associated people.

In step T15, the cloud based server sends a message to the device associated with the doctor, via the radio access network. The message may advise the doctor to move to the site of the accident.

In step T16, the apparatus of the device associated with the doctor may be configured to cause a message to be sent to the emergency services provider indicating that the doctor has arrived. This message may be sent responsive to input from the user (the doctor) or may be automatically sent based on the location of the device. The message may be sent to the emergency services provider via the RAN and the cloud based server or simply via the RAN.

In step T17, a message is sent from the cloud based server via the access node to the device associated with the doctor closing the communication path.

In step T18, a message is sent from the cloud based server via the RAN to the emergency service provider closing the communication path.

Steps T17 and T18 can take place in any order or at the same time.

In step T19, the cloud server deletes all information about the discovered devices. This may be optional in some embodiments.

In some embodiments, there may be automatic accident detection which automatically will contact the cloud based server in case an accident is detected. It is then up to the cloud based server to trigger the generation of a ping or the detector may request permission to send a ping message itself.

Figure 9:
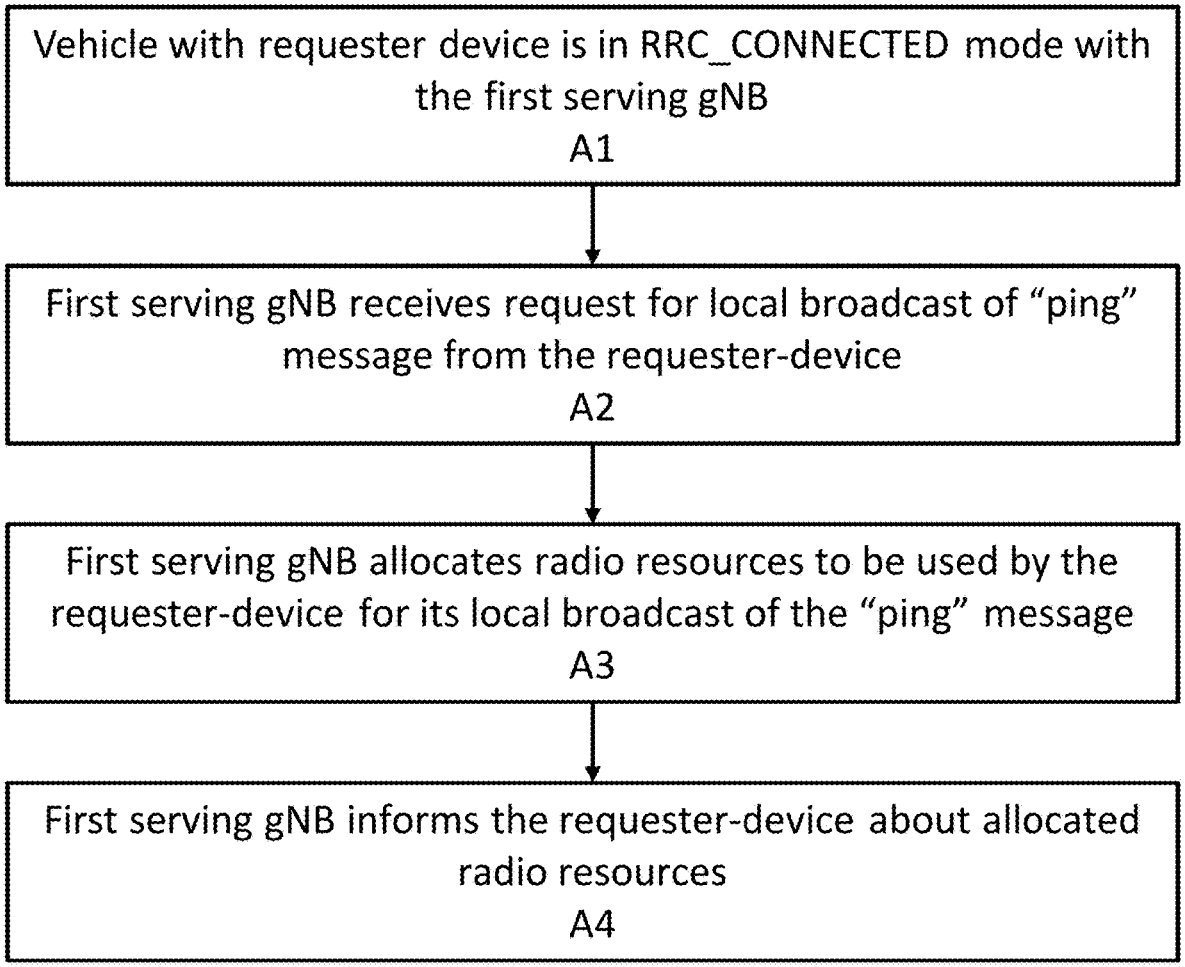
FIG. 9 shows a method performed by an apparatus of a radio access network.

Reference is made to FIG. 9, which shows a method performed by an apparatus of an access node of the RAN. The access node may be a serving gNB of a 5G system.

In A1, a vehicle with the requester device arrives at a location of an emergency and the apparatus cause a connection to be established between the requester device and the access node in a RAN. Alternative the requester device is stationary and is activated such that the apparatus of the requester device is configured to cause a connection to be established with an access node of the RAN. Where there is already a connection with the RAN, this step may be omitted in some embodiments.

In A2, a request is received from requester device for broadcast permission for one or more ping messages and/or for the radio resources for the one or more ping messages.

In A3, the apparatus of the access node is configured to allocate radio resources to be used for the ping messages.

In A4, the apparatus is configured to cause a message to be transmitted to the requester device with information about the allocated resources.

Figure 10:
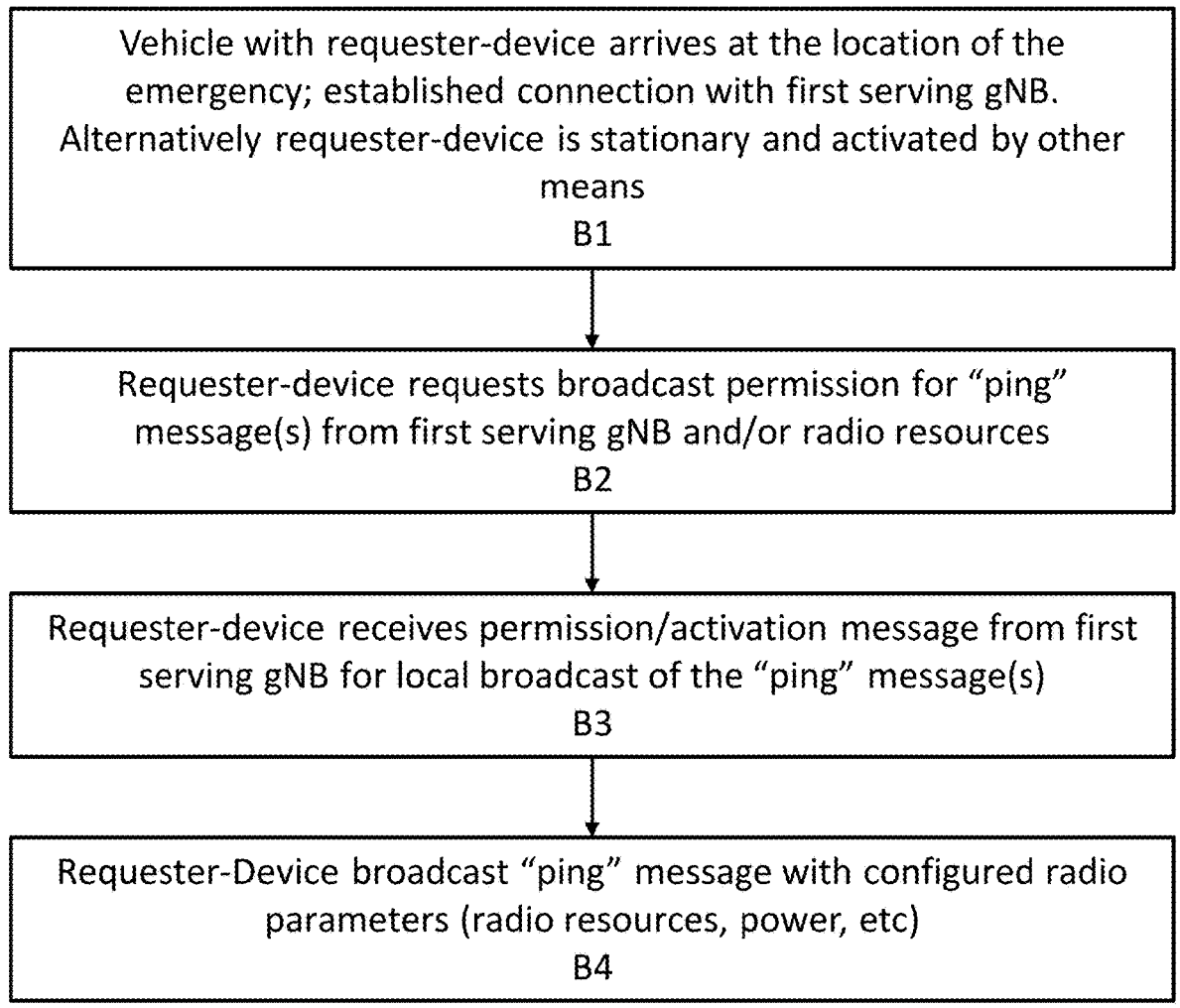
FIG. 10 shows a method performed by an apparatus of a requester device.

Reference is made to FIG. 10, which shows a method performed by an apparatus of a requester device.

In B1, a vehicle with the requester device arrives at a location of an emergency and the apparatus is configured to cause a connection to be established with an access node in a RAN. The access node may be a serving gNB of a 5G system. Alternative the requester device is stationary and is activated such that the apparatus of the requester device is configured to cause a connection to be established with an access node of the RAN. Where there is already a connection with the RAN, this step may be omitted in some embodiments.

In B2, the apparatus of the requester device is configured to cause a request to be transmitted to the access node for broadcast permission for one or more ping messages and/or for the radio resources for the one or more ping messages.

In B3, the apparatus of the requester device is configured to receive a message for access node. The message may be a permission or activation message for the local broadcast of the one or more ping messages.

In B4, the apparatus of the requester device is configured to cause the requester device to broadcast the one or more ping message. The ping message may be broadcast with one or more configured radio parameters. The radio parameter may be radio resources, power and/or the like.

Figure 11:
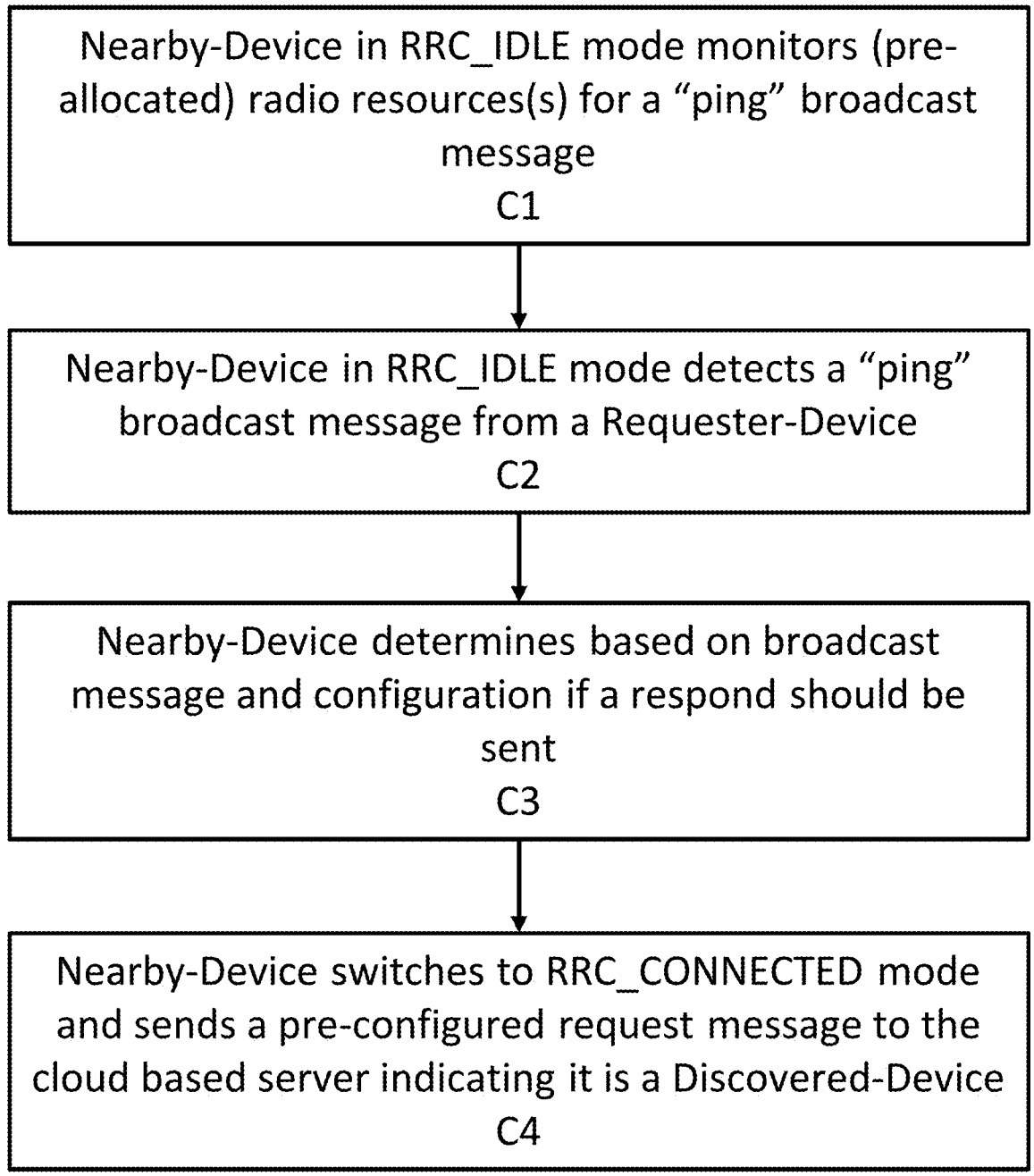
FIG. 11 shows a method performed by an apparatus of a nearby device.

Reference is made to FIG. 11, which shows a method performed by an apparatus of a device nearby to the requester device.

In C1, the apparatus of the nearby device is configured to cause the nearby device to be in a mode in which the device is able to monitor radio resources for a ping broadcast message transmitted by the requester device. The mode may be an idle mode such as an RRC IDLE mode or any other suitable mode. The radio resources may be pre-allocated or predefined radio resources. The app which is installed on the nearby device will cause the nearby device to be monitor for such message or to recognize those ping messages which are for that device.

In C2, a ping broadcast message is received by the nearby device from the requester device.

In C3, the apparatus of the nearby device determines based on the broadcast message and/or configuration of the application if a response should be sent. This determination may require input from the human user of the device. The apparatus of the nearby device may cause a message to be displayed on the display, requesting input from the human user. Depending on the input by the user or even the lack of input, this will be used by the apparatus to determine if a response is to be sent. In other embodiments, the apparatus itself may be configured to determine if a response is to be sent without input from a human user. In some embodiments, the apparatus may use AI (artificial intelligence) to determine if a response should be sent. In some embodiments, a computer program may be used to determine if a response is to be sent.

In C4, if a response is to be sent, the apparatus is configured to cause the nearby device cause a message to be transmitted, via an access node, to the cloud based server. The message may be a preconfigured message. The message may indicate that the device is a discovered device. The device may be in any suitable mode such as a connected mode, for example such as a RRC_CONNECTED mode.

Figure 12:
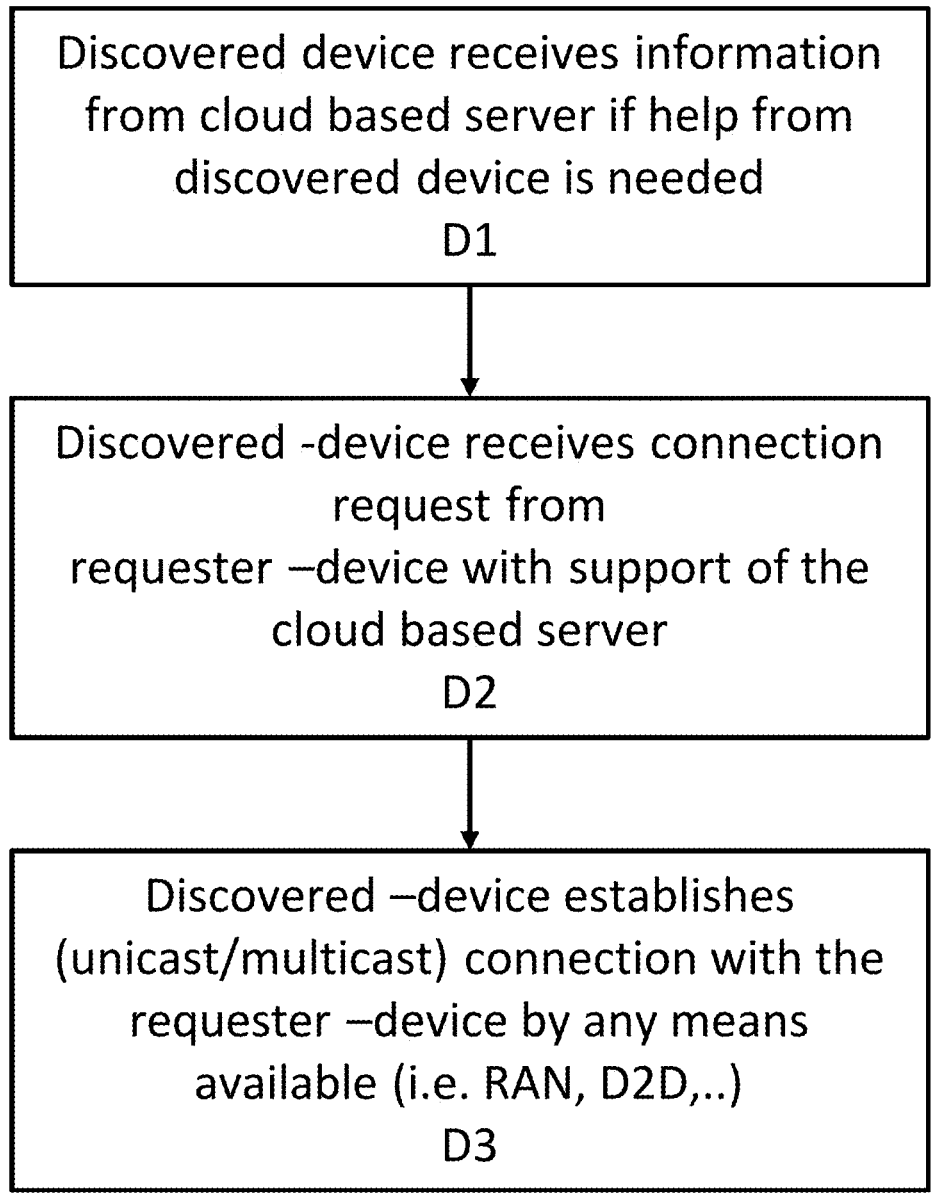
FIG. 12 shows a method performed by an apparatus of a discovered device.

Reference is made to FIG. 12 which shows a method performed by an apparatus of a discovered device. A discovered device is a nearby device which has sent a message to the cloud based server indicating that the device is discovered.

In D1, the apparatus of the discovered is configured to receive a message which is transmitted to the discovered device from the cloud based server. The message may comprise information indicating that help is needed. The information may indicate what help or assistance is required.

In D2, the discovered device is configured to receive a connection request from the requester device, facilitated by the support of the cloud based server.

In D3, the apparatus of the discovered device is configured to cause the discovered device to establish a connection with the requester device. This may be a unicast, broadcast or multicast connection. The connection may be via a RAN or via a device to device D2D connection.

Figure 13:
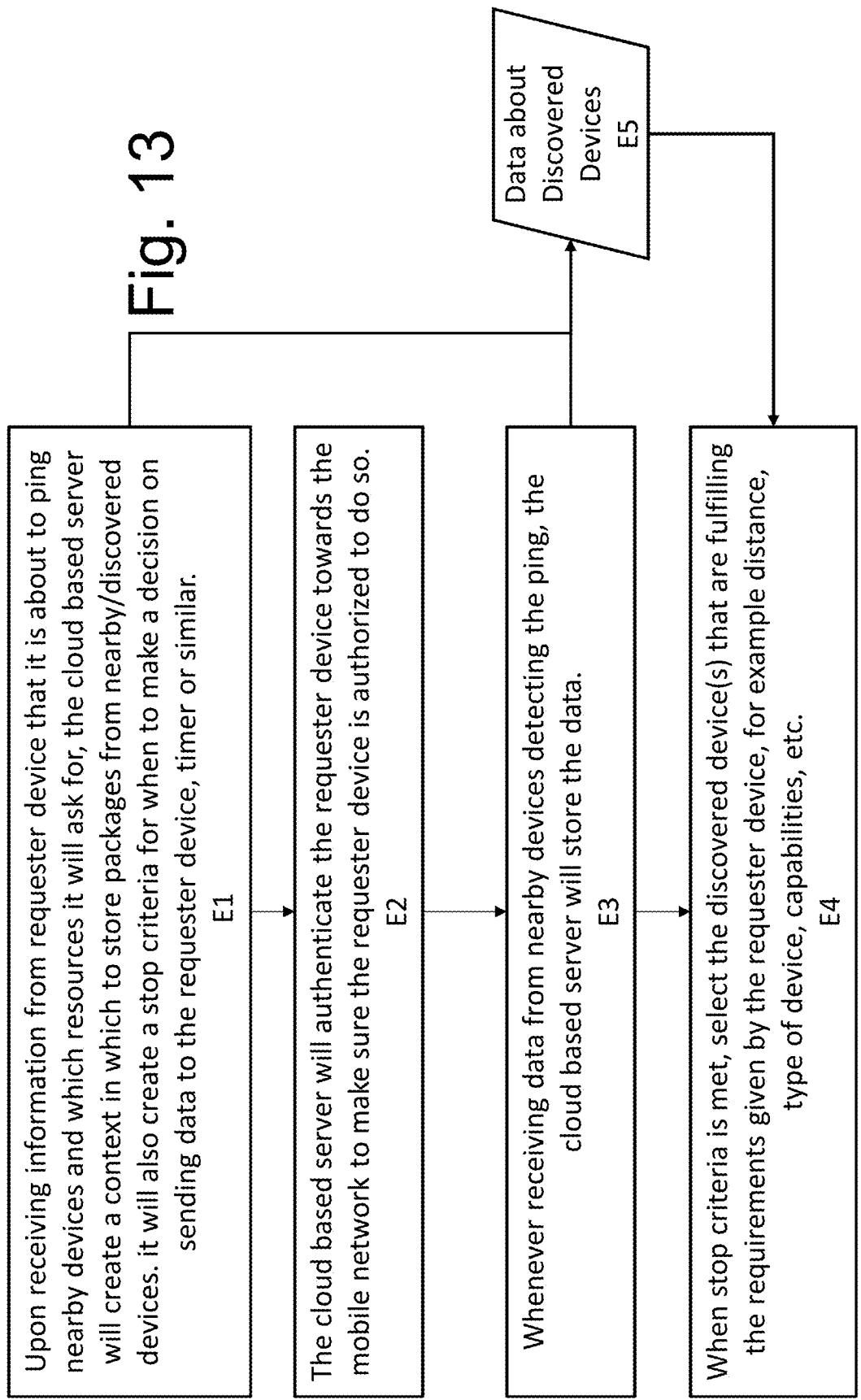
FIG. 13 shows a first method performed by an apparatus of a server.

In FIG. 13, a method performed by an apparatus of the cloud based server or the cloud based server will now be described.

In E1, when information is received from a requester device, the apparatus of the cloud based server or the cloud based server will create a context in which to store packages from nearby/discovered devices. The stored data is represented by block E5. The information from the requester device may be that requester device is about to ping nearby devices and/or the resources that it is requesting.

Alternatively or additionally, a stop criteria may be created for when to make a decision on sending data to the requester device. This may be using a timer or the like.

In E2, the apparatus of the server or the server is configured to authenticate the requester device towards mobile network.

In E3, the apparatus of the server or the server is configured to store data from nearby devices. The stored data is represented by block E5.

When stop criteria is met, in E3, the apparatus of the server or the server is configured to select one or more discovered device(s) that are fulfilling the requirements given by the requester device, for example distance, type of device, capabilities, etc. This may use stored data represented by block E5.

Figure 14:
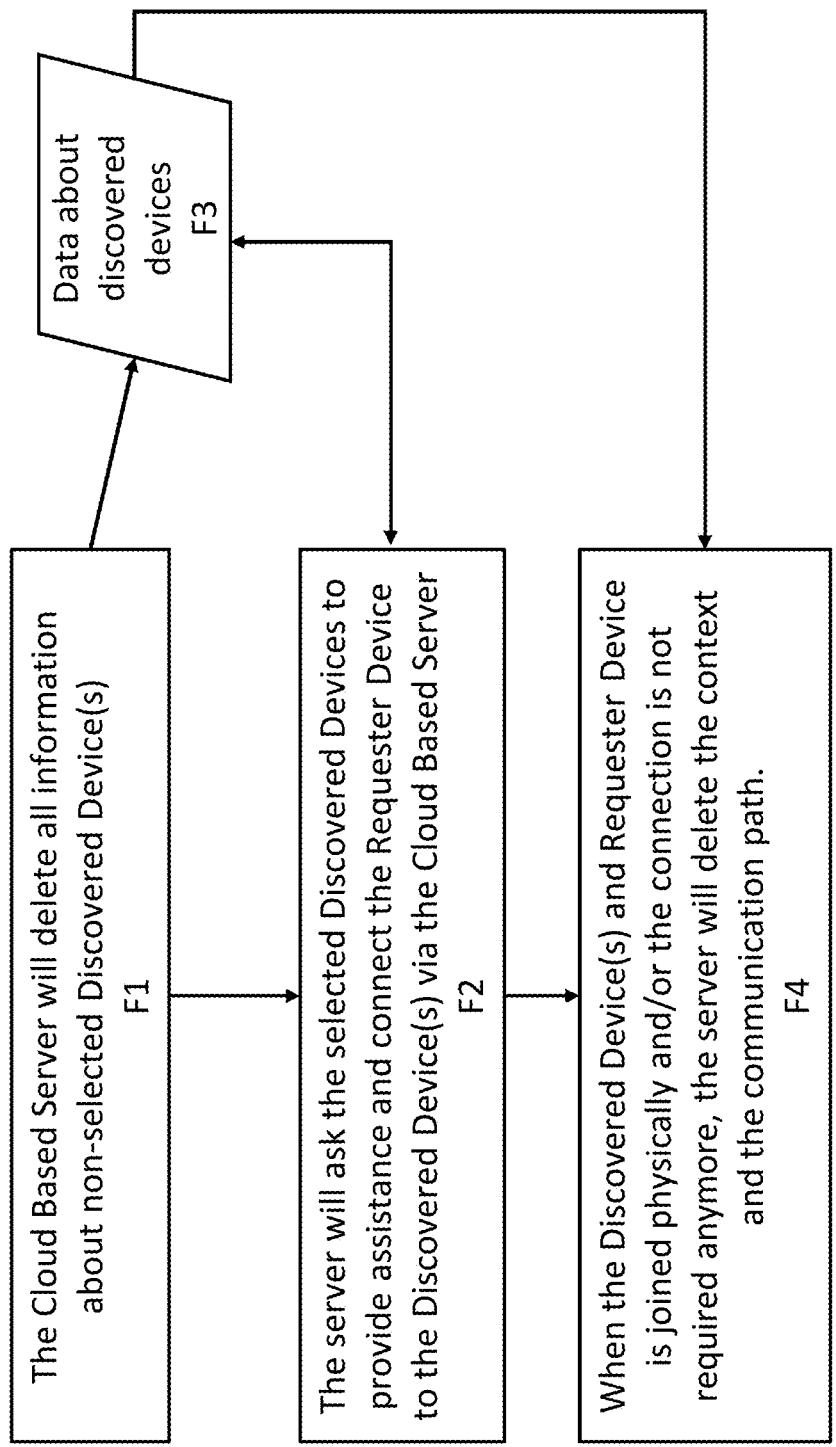
FIG. 14 shows a second method performed by an apparatus of a server.

Reference is made to FIG. 14, which shows a method a method performed by an apparatus of the cloud based server or the cloud based server, when there is a direct communication context.

In F1, the apparatus of the cloud based server or the cloud based server is configured to cause information about non selected discovered devices to be deleted. Reference F3 schematically represents the stored data relating to the discovered devices. The data may be stored in a database.

In F2, the apparatus of the cloud based server or the cloud based server will request that the selected discovered devices provide assistance and cause the requester device to be connected to the discovered Device(s) via the cloud based server.

In F3, when the discovered device(s) and requester device are in a same location and/or the connection is not required anymore, the apparatus of the server or the server will delete the context and the communication path.

In the described embodiments, reference has been made to a cloud based server. However, it should be appreciated that this is by way of example only and in other embodiments any other suitable server may be used.

Figure 15:
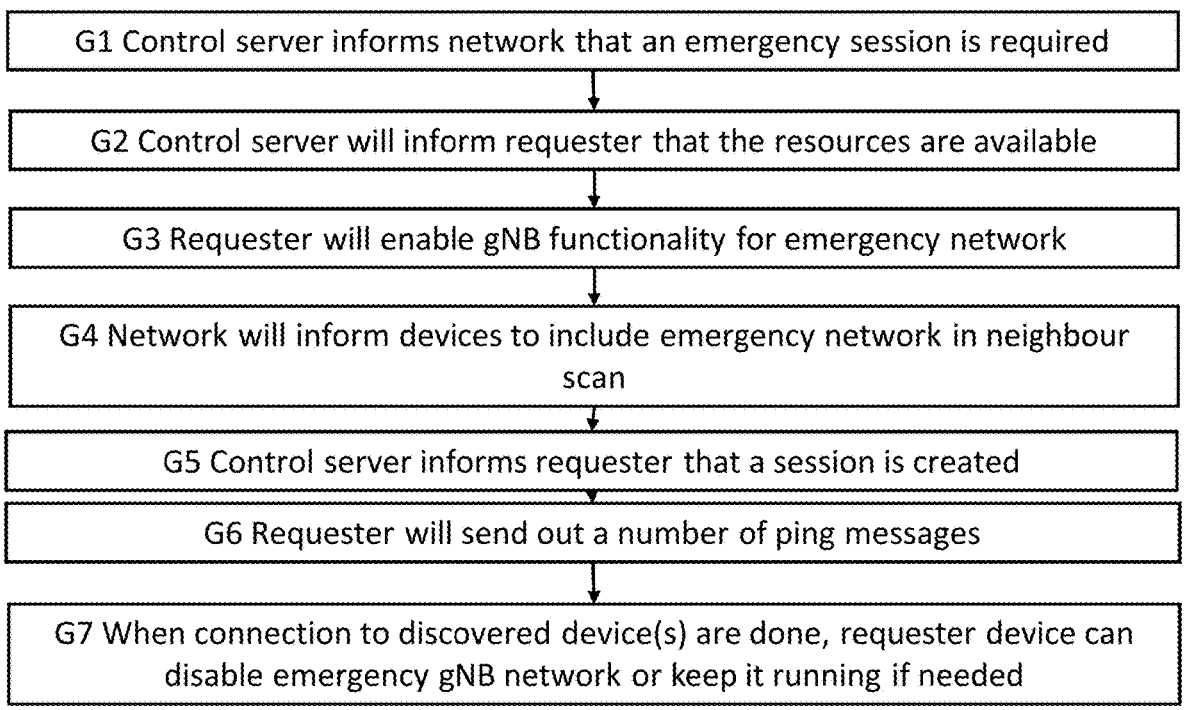
FIG. 15 shows a method for causing a requester device to act as an emergency access node.

Reference is made to FIG. 15 which shows the setting up of a requester device to act as an "access node" so that the requester device can transmit ping messages.

In G1, the server informs the network that an emergency session is required.

In G2, the G2 Control server will inform requester that resources are available for the emergency network.

In G3, a requester will enable access node, such as gNB, functionality for the emergency network.

In G4, the network will inform devices to include the emergency network in a neighbor scan.

In G5, the control server informs requester that a session is created.

In G6, the requester will send out one or more ping messages.

In G7, when the connection to the one or more discovered device(s) are done, the requester device can disable the emergency access node network or keep it running if needed.

Figure 16:
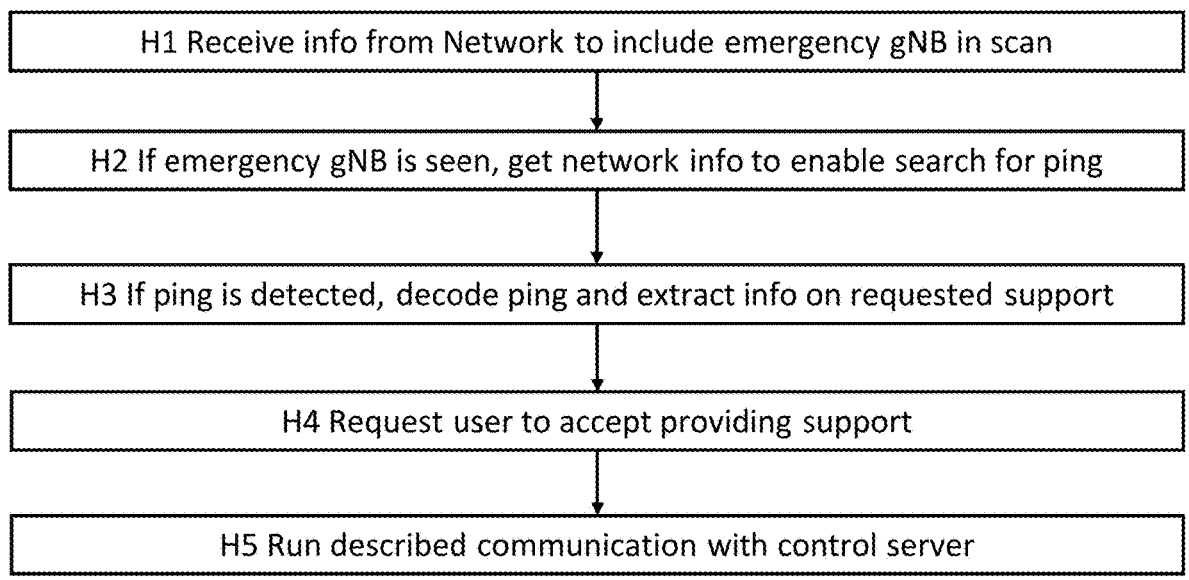
FIG. 16 shows a method performed by an apparatus of a discovered device.

Reference is made to FIG. 16 which shows a method performed at the discoverable device.

In H1, information is received from the network to include the emergency access node, for example the emergency gNB, in its scans.

In H2, if the emergency gNB is seen, the discoverable device will get network information to enable searching for ping messages.

In H3, if a ping message is detected, the discoverable device will decode the ping information and extract information on the requested support.

In H4, the discoverable device will request that the user accept providing of support. For example, a message may be displayed and the user may be required to provide an input to that message.

In H5, the discoverable device will communicate with the control server as previously described.

The generation of the ping depends on the content of the ping and how many times it should be send in case the first ping does not result in any discovered devices.

If the ping contains all relevant data, the requester should ask for resources for this one ping only.

If two or more pings are required, one or more of the following options may be considered when the cloud based server informs the requester device about the pings required:

the requester device will treat each ping individually with respect to the RAN. For example, the requester device will request resources for each ping one by one or sets of pings; and the requester device will request from the RAN the resources for all pings in one request.

In case the first ping does not result in any discovered devices, the cloud based server can request a second (or more) ping(s) to be generated by the requester device. The second ping sequence may be handled like the first ping sequence.

In some embodiments, the number of pings for the same resource may be pre-defined by the cloud based server and handling the sequence of pings may be left for the requester device. In this embodiment, all pings in the sequence may be expected to be send out no matter if a discovered device covering the requested resources are found by the first ping.

A ping can be divided into several sub groups, for paging subgroups.

A ping message may comprise one or more of the following:

A reference ID. This may be used to relate the actual ping request to a created context on the cloud based server. It may be used where more than one ping needs to be sent out for the nearby and discovered devices to know if they have already acted on an earlier ping with a same reference ID.

A group ID. This may be used to indicate which type of support is requested (i.e., doctor, medicine, nurse, etc.).

A sub-group ID. This is to be used for further precision of the group identifier (i.e., type of doctor, type of medicine, etc.).

Event ID such as discussed previously. An event ID may be as an alternative to or in addition to one or more of the group ID and the sub-group ID.

In some embodiments, the ping message may comprise a plurality of group ID and/or a plurality of sub-group IDs and/or event IDs. This may for example if a plurality of different resources are required.

In some embodiments, different ping messages may be sent with the same reference ID but identifying one or more different group IDs and/or different sub-group IDs and/or event IDs.

Optionally the ping message can include location data of the requester device and/or instructions to the nearby device that it should not answer in case it has a travel time greater than a given amount. This may be defined by the cloud based server for each context ID or may be set as a default or otherwise defined. The location data may comprise any suitable location data such as GNSS or GPS data.

The response from a nearby devices to the cloud based server may contain one or more of the following:

the reference ID from the ping which the respond is related to;

the group and sub group ID(s), which the nearby device can support;

location data about the position of the nearby device; and transport options available for nearby device for the cloud based server to estimate how fast the nearby device can move to the location of the requester device if needed.

In some embodiments, a signalling message is communicated between the nearby devices and a controller. The controller may for example be a cloud based server or any other suitable server. An acknowledgement message may be triggered by the received "ping" signal as a response. The acknowledgement message may be preconfigured. The devices which send this request from the controller may be considered as discovered devices. These discovered devices may be a sub-set of the nearby devices. The acknowledgement message may include information such as one or more of emergency help capabilities, location, owner availability, and/or the like.

A message may be sent between the controller and the discovered devices with which the controller can confirm the request.

In some embodiments, the controller may (in co-operation with the RAN) provide resource configuration to be used for direct communication between requester device and discovered device. For example, the resource configuration may comprise radio resources where the discovered devices are to expect connection establishment with the requester-device when this is a relay or access node part of the RAN.

A core network CN/application signalling message may be provided between the cloud based server and the discovered devices with which the human user of the discovered devices are informed on the emergency request; in case there is no direct human user (e.g., public defibrillator), the application at the discovered device can indicate/signal the emergency request.

The requester-device may act as a local access node or simplified IAB/relay. The requester device may be limited to only broadcasting the "ping" message(s) on the pre-configured radio resources. The requester device may need to be a requester device which allowed to be such a device.

The cloud based server may be configured to control the registration and collection of the requests between the discovered devices and the requester-device. The server device may be automatically controlled and/or user controlled. The server may provide the information and/or capabilities to setup a connection between requester device and discovered device. The communication can be established in any suitable way. By way of example, the communication can be established as a standard IP traffic (voice and/or messages) connection and/or as D2D (device to device) for direct connection between requester device and discovered device or in any other suitable manner.

The cloud based server may be responsible for selecting which of the responding nearby devices should be contacted for potentially becoming discovered devices. Several criteria can be considered for the cloud based server to be used for this. One or more of the following criteria may be taken into account:
  group and sub group support;
  distance to requester device; and
  possible other capabilities of nearby devices which potentially could be needed based on type of original requested capabilities (i.e., one type of doctor might be more suited).

In some situations, the cloud based server will receive feedback from several nearby devices. In such cases the cloud based server may have to do a stricter selection.

One or more of the following options may be used to reduce the number of found nearby devices in areas (i.e., a city center or the like) where it is expected the ping would reach a high number of nearby devices:
  tell the requester device to reduce power in the ping, hence reaching a smaller number of nearby devices; and
  refine the request to reduce the number of matching devices.

In some embodiments, nothing will be stored in the cloud based server for later use. For example, once the communication between the requester device and discovered device (s) are established by the cloud based server, the emergency application server will delete all information/logs about the communication. Alternatively or additionally, the data is deleted once an indication has been received that the event is completed and/or after a given amount of time. This may ensure that privacy of the detected device users is kept.

Embodiments are not limited to previously described examples which are provided only as possible illustrative examples. Other embodiments may be applied where there is a situation requiring detection and identification of nearby devices. This may potentially be in emergency scenarios but other embodiments may have application in any other suitable scenario. For example, some embodiments may be used in IIOT or IOT scenarios to allow one IOT device to establish a connection with one or more other devices. The one or more other devices may be an IOT device or a non IOT device.

For security, in some embodiments, care is taken to ensure that only approved "ping" stations will be able to trigger the local devices to contact the network. In some embodiments, there may be some grouping of devices supporting one or more features so that only the one or more needed group are "pinged".

The nearby devices may be listening intermittently for a ping. The ping may in some embodiments be transmitted for a given period of time such that the nearby devices may receive the ping, even when they are listening intermittently.

Some embodiments may provide one or more advantages. Some embodiments may provide a reliable discovery mechanism for a requester-device to discover nearby devices with relevant emergency capabilities under the control of a RAN and a Cloud Based Server. The RAN network may be any suitable network. By way of example only, the RAN may be a 3GPP RAN.

Some embodiments may provide a reliable communication channel between a requester-device and relevant nearby devices in an ad-hoc manner partly under the control of a RAN.

Some embodiments may improve the chances for someone having a stroke/accident/heart attack and/or the like to survive due to shortened response time by the appropriate personnel. In some embodiments, only those nearby devices/users are triggered which are in the relevant geographical area of the emergency (requester-device).

Some embodiments may be implemented without the need to have a global database of available fixed position devices in the cloud based server. However, other embodiments may make use of a global database of such devices.

Some embodiments may be implemented without the need to have a global database of all discoverable devices which have installed the application required to be part of the overall system setup. However, other embodiments may make use of a global database of such devices.

Some embodiments may provide the ability to get knowledge about low power devices (and optionally their associated users) in the vicinity of the emergency.

Some embodiments may address privacy issues by deleting privacy related data from the cloud server after the end of communication. This may be dependent on the legislation in the jurisdiction in which embodiments are provided.

In addition to the earlier given examples the following use-cases may alternatively or additionally provided.

An access node, such a gNB may act as the requester device itself. This may, for example, be for larger events or condensed concentration of users. This may be used on a cruise ship, a train, a plane and/or in concerts.

The cloud based server may support registration of nearby devices at events for a certain period of time and the contexts may allowed "survive" until the event is over. In this way, the cloud based server would be aware of potential support during the event (i.e., how many doctors might be attending the event).

Some embodiments may be applied in the context of automatic incident detection.

Some embodiments provide a method. The method may be performed by an apparatus. The apparatus may be a first device or provided in the first device. The first device may be a requester device. The apparatus may be as shown in FIG. 5.

The method may comprise receiving first information about a context provided by a controller. The first information may be received from a base station, The method may further comprise causing a first device to transmit one or more ping messages to one or more second devices. The one or more ping messages may comprise information about said context which causes one or more second devices to reply to the controller.

Some embodiments provide a method. The method may be performed by an apparatus. The apparatus may be a second device or provided in the second device. The second device may be a nearby device. The apparatus may be as shown in FIG. 5.

The method may comprise receiving a ping message which is transmitted by a first device. The message may comprise information about a context associated with a controller.

The method may further comprise causing a message to be transmitted to the controller using the context associated with the controller.

Some embodiments provide a method. The method may be performed by an apparatus. The apparatus may be a controller or provided in the controller. The controller may be a cloud server. The apparatus may be as shown in FIG. 5.

The method may comprise receiving a request for a context from a first device.

The method may comprise causing a message to be transmitted from a controller to the first device via a base station. The message may comprise first information about the context.

The method may comprise receiving one or more responses from one or more second devices using the context. The one or more responses may be to one or more ping messages transmitted by the first device.

It is noted that while the above describes example embodiments, there are several variations and modifications which may be made to the disclosed solution without departing from the scope of the present invention. In particular, different embodiments have been described. Different features from different embodiments may be combined.

The embodiments may thus vary within the scope of the attached claims. In general, some embodiments may be implemented in hardware or special purpose circuits, software, logic, or any combination thereof. For example, some aspects may be implemented in hardware, while other aspects may be implemented in firmware or software which may be executed by a controller, microprocessor, or other computing device, although embodiments are not limited thereto. While various embodiments may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively or additionally some embodiments may be implemented using circuitry. The circuitry may be configured to perform one or more of the functions and/or method procedures previously described. That circuitry may be provided in the network entity and/or in the communications device and/or a server and/or a device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware, and (ii) any portions of hardware processor(s) with software (including digital signal processor(s)), software, and memory(ies) that work together to cause the communications device and/or device and/or server and/or network entity to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus, provided in use in a first device, said apparatus comprising:
   at least one processor and at least one memory including a computer program code, the at least one memory and computer program code configured to, with the at least one processor, cause the apparatus at least to:
   receive first information about a context provided by a controller, said first information being received from a base station; and
   cause the first device to transmit one or more ping messages to one or more second devices, said one or more ping messages comprising:
   information about said context which causes one or more second devices to reply to the controller;
   location data of the first device and an instruction that a nearby device should not answer if the nearby device has a travel time greater than a given amount; and
   session identity information.

2. The apparatus as claimed in claim 1, wherein the at least one memory and computer program code is configured to, with the at least one processor, cause the apparatus to cause a request to be transmitted to the controller via the base station for the context, the first information about the context being received in response to the request.

3. The apparatus as claimed in claim 1, wherein the at least one memory and computer program code is configured to, with the at least one processor, cause the apparatus to receive second information about radio resources from the base station and cause the first device to use the radio resources to transmit the one or more ping messages.

4. The apparatus as claimed in claim 3, wherein the at least one memory and computer program code is configured to, with the at least one processor, cause the apparatus to cause a request to be transmitted to the controller via the base station for the radio resources, the second information about the radio resources being received in response to the request.

5. The apparatus as claimed in claim 1, wherein the at least one memory and computer program code is configured to, with the at least one processor, cause the apparatus to cause communication between the first device and one or more of the second devices via the controller after the ping message has been received by the respective second device.

6. The apparatus as claimed in claim 1, wherein said one or more ping messages further comprise configured radio parameters.

7. The apparatus as claimed in claim 1, wherein said one or more ping messages further comprise a group identifier.

8. An apparatus, provided in use in a second device, said apparatus comprising:
   at least one processor and at least one memory including a computer program code, the at least one memory and computer program code configured to, with the at least one processor, cause the apparatus at least to:
   receive a ping message which is transmitted by a first device, said message comprising:
   information about a context for finding devices near the first device; and
   session identity information; and
   cause a message to be transmitted to the controller first device using the context associated with the controller first device, the message including location data about a position of the second device.

9. The apparatus as claimed in claim 8, wherein the at least one memory and computer program code is configured to, with the at least one processor, cause the apparatus to determine that support which is requested in said at least one ping message can be provided, and provide in the message to be transmitted, to said first device, information indicating that the support which is requested can be provided.

10. The apparatus as claimed in claim 9, wherein the at least one memory and computer program code is configured to, with the at least one processor, cause the apparatus to determine that support which is requested in said at least one ping message can be provided in response to input requested from an associated user of the device.

11. The apparatus as claimed in claim 8, wherein the at least one memory and computer program code is configured to, with the at least one processor, cause the apparatus to cause communication between the second device and a device via the first device after the message has been transmitted to the first device.

12. The apparatus as claimed in claim 8, wherein the ping message further comprises information about support required from the second device and/or an associated user.

13. The apparatus as claimed in claim 12, where the information about support comprises one or more subgroup identifiers.

14. The apparatus as claimed in claim 12, wherein the ping message comprises location information associated with the first device.

15. The apparatus as claimed in claim 8, wherein said message further comprises configured radio parameters.

16. The apparatus as claimed in claim 8, wherein said message further comprises a group identifier.

17. An apparatus, provided in use in a controller, said apparatus comprising:
   at least one processor and at least one memory including a computer program code, the at least one memory and computer program code configured to, with the at least one processor, cause the apparatus at least to:
   receive a request for a context from a first device;
   cause a message to be transmitted from the controller to the first device via a base station, said message comprising:
   first information about the context; and
   a group identifier indicating a type of support that is requested; and
   receive one or more responses from one or more second devices using the context, the one or more responses being to one or more ping messages transmitted by the first device.

18. The apparatus as claimed in claim 17, wherein the at least one memory and computer program code is configured to, with the at least one processor, cause the apparatus to determine, based on the one or more responses, which one or more second devices the controller is to communicate with via one or more base stations.

19. The apparatus as claimed in claim 17, wherein said message further comprises session identity information.

20. The apparatus as claimed in claim 17, wherein said message further comprises a group identifier.

* * * * *

UNITED STATES PATENT AND TRADEMARK OFFICE
CERTIFICATE OF CORRECTION

PATENT NO. : 11,849,509 B2  
APPLICATION NO. : 17/301293  
DATED : December 19, 2023  
INVENTOR(S) : Petersen et al.

Page 1 of 1

It is certified that error appears in the above-identified patent and that said Letters Patent is hereby corrected as shown below:

On the Title Page

Item (72), "Inventors", delete "Aalbaorg" and insert therefor -- Aalborg --.

In the Claims

In Column 25, Line 62, Claim 8, after "the" delete "controller".

In Column 25, Line 63 to Column 26, Line 1, Claim 8, after "with the" delete "controller".

In Column 26, Line 25, Claim 13, delete "where" and insert therefor -- wherein --.

Signed and Sealed this  
Twenty-ninth Day of April, 2025

Coke Morgan Stewart  
*Acting Director of the United States Patent and Trademark Office*